(12) United States Patent
Kalany et al.

(10) Patent No.: US 7,134,258 B2
(45) Date of Patent: Nov. 14, 2006

(54) PACKAGING APPARATUS AND METHODS

(75) Inventors: Robert M. Kalany, Florence, KY (US); Keith G. Jacobs, Loveland, OH (US)

(73) Assignee: R.A. Jones & Co. Inc., Crescent Springs, KY (US)

( * ) Notice: Subject to any disclaimer, the term of this patent is extended or adjusted under 35 U.S.C. 154(b) by 95 days.

(21) Appl. No.: 10/309,854

(22) Filed: Dec. 4, 2002
(Under 37 CFR 1.47)

(65) Prior Publication Data

US 2003/0136086 A1   Jul. 24, 2003

Related U.S. Application Data

(60) Provisional application No. 60/336,963, filed on Dec. 5, 2001.

(51) Int. Cl.
*B65B 3/04* (2006.01)
*B65G 47/31* (2006.01)
*G06F 19/00* (2006.01)

(52) U.S. Cl. .................. 53/473; 198/460.1; 700/112
(58) Field of Classification Search .............. 53/252, 53/566, 473, 458; 198/419.2, 419.3, 460.1; 700/95, 99, 102, 112, 228, 229, 230; 310/12
See application file for complete search history.

(56) References Cited

U.S. PATENT DOCUMENTS

| | | | | |
|---|---|---|---|---|
| 4,571,236 A | * | 2/1986 | Adams | 493/319 |
| 4,675,582 A | * | 6/1987 | Hommes et al. | 318/38 |
| 4,704,568 A | * | 11/1987 | Beck et al. | 318/687 |
| 4,825,111 A | * | 4/1989 | Hommes et al. | 310/12 |
| 4,841,869 A | * | 6/1989 | Takeuchi et al. | 104/292 |
| 4,982,556 A | * | 1/1991 | Tisma | 53/506 |
| 5,092,450 A | * | 3/1992 | Schommartz et al. | 198/460.1 |
| 5,175,976 A | * | 1/1993 | Petry et al. | 53/252 |
| 5,185,984 A | * | 2/1993 | Tisma | 53/252 |
| 5,560,476 A | * | 10/1996 | Lee | 206/38 |
| 5,715,657 A | * | 2/1998 | Mondani et al. | 53/457 |
| 5,768,856 A | * | 6/1998 | Odenthal | 53/443 |
| 5,939,845 A | * | 8/1999 | Hommes | 318/6 |
| 5,965,963 A | * | 10/1999 | Chitayat | 310/12 |
| 6,011,508 A | | 1/2000 | Perreault et al. | |

(Continued)

FOREIGN PATENT DOCUMENTS

EP   0 695 703   *   4/1995

(Continued)

OTHER PUBLICATIONS

Wayne Robinson & Rob Lankin, Agile Systems, Inc. Waterloo, Ontario, Canada, *Distributed Control of A PM Brushless Motor With Multiple Moving Elements* Jan. 2001 6 pages (see www.agile-systems.com/databook/).

(Continued)

*Primary Examiner*—Stephen F. Gerrity
*Assistant Examiner*—Paul Durand
(74) *Attorney, Agent, or Firm*—Wood, Herron & Evans LLP

(57) ABSTRACT

A packaging system includes a transport defined by a linear motor driving independent elements in a path to carry out a packaging function. The elements are driven independently of other elements in the path and are driven by the linear motor in a section of the path under the influence of an external axis signal from an operably adjoining packaging function to register and synchronize the elements in position and time with a moving component or event of the adjoining function in a downstream direction. Method and apparatus are disclosed.

40 Claims, 15 Drawing Sheets

U.S. PATENT DOCUMENTS

| | | | |
|---|---|---|---|
| 6,105,338 | A | 8/2000 | Kalany et al. |
| 6,191,507 | B1 * | 2/2001 | Peltier et al. ................. 310/12 |
| 6,202,392 | B1 * | 3/2001 | Greenwell et al. ............ 53/566 |
| 6,220,424 | B1 * | 4/2001 | Fluck ...................... 198/468.6 |
| 6,286,290 | B1 * | 9/2001 | Fluck ............................ 53/54 |
| 6,421,984 | B1 * | 7/2002 | Murgatroyd et al. .......... 53/468 |
| 6,625,517 | B1 | 9/2003 | Bogdanov et al. |
| 6,715,598 | B1 * | 4/2004 | Affaticati et al. ........... 198/357 |
| 6,876,107 | B1 * | 4/2005 | Jacobs ........................ 310/12 |
| 6,876,896 | B1 * | 4/2005 | Ortiz et al. ................. 700/112 |

FOREIGN PATENT DOCUMENTS

| | | | |
|---|---|---|---|
| GB | 2 260 743 | * | 4/1993 |
| WO | WO 00/64742 | | 11/2000 |
| WO | WO 00/64751 | | 11/2000 |
| WO | WO 00/64753 | | 11/2000 |
| WO | WO 00/64791 | | 11/2000 |
| WO | WO 01/85581 | * | 5/2001 |
| WO | WO 01/85581 A1 | | 11/2001 |

OTHER PUBLICATIONS

Lanco and MagneMotion, *High Speed Assembly Automation System* 2001, 5 pages.

Automation Tooling Systems of Ontario, Canada, *Automation Tooling Systems Automation, Supertrak* 2001 4 pages.

Agile Systems & ATS, *(webpage) Supertrak: Linear Motor Conveyor Systems* 2001, 3 pages.

Automation Tooling Systems of Cambridge, Ontario, Canada, *Automation Tooling Systems Automation Supertrak TM Modular Conveyor System* 2002, 6 pages.

* cited by examiner

PACKAGING APPARATUS AND METHODS

Benefit is claimed of the filing date of Dec. 5, 2001 of U.S. provisional patent application Ser. No. 60/336,963. Such application is expressly incorporated herein by reference as if fully set forth herein.

BACKGROUND OF THE INVENTION

This invention relates to packaging, and more particularly to packaging apparatus and methods and to product handling apparatus and methods.

In current systems handling products and packages such as cartons, for example, it is common to use conveyors or transfers to convey cartons, to transfer products and to handle products. Such conveyors or transfers typically define elements such as carton or product lugs, trays, buckets or the like, where the elements are typically linked together by a drive system. Such trays, buckets, lugs or the like will be referred to herein as "elements", i.e. carton conveying elements or product conveying elements, wherein an element is typically one of a plurality of elements disposed for movement in a path as a conveyor function. Such elements typically bear a relation to one another. That is, the elements are interconnected in a common drive system so that displacement of one element in said path causes or requires displacement of another element. This is due to the mechanical, pneumatic, hydraulic, electric or other form of drive which, when operated, causes all elements to move, one in relation to another.

While there have been several devices allowing one element to stop while others keep moving in a short range, or very limited area such as traveling conveyors, floating or hesitating bucket systems, variable loops or other mechanical expedients, the general limitation of having to move or index all elements defining a single conveyor throughout most of the range of movement continues. In many of these, the pitch of the elements is also a constant through at least a portion of the circuit.

In many packaging or cartoning processes, it is common to operably juxtapose one conveyor having elements, with another conveyor system having elements, and with an operable indexing of adjacent elements of the respective conveyors to provide a desired operation. Thus, for example, a carton conveyor may have a plurality of carton conveying lugs, comprising elements, carried in a path, part of which is operably aligned adjacent to a bucket conveyor having a plurality of buckets which can be filled with groups of articles to be cartoned. When a filled bucket is operably indexed, by alignment or position, acceleration and velocity, with an empty carton carried between lugs, the article group in the bucket can be transferred into the adjacent carton, such as by a pusher or other device.

Likewise, in a product handling operation, a net or sequential weigh scale weighs a product. Product receptors or elements are conveyed under the scale to receive appropriately weighed product loads from the scale, and then to a discharge location over a pouch filler wheel, for example.

While such conveyor or handling systems have worked well and have been the core of cartoning, product handling or other packaging systems, there remain inherent difficulties. For example, random events upstream of or affecting one conveyor system or packaging operation, or downstream of or affecting another conveyor system or packaging operation, can cause overall system shutdowns. For example, if there is a jam associated with feeding articles from buckets in a bucket conveyor to cartons on a carton conveyor, the whole system might be stopped or locked up until the problem is cleared. This could jam upstream production or motion or downstream operation. For example, cartons being closed or glued might be delayed in that process, requiring rejection of cartons and loads between the jams and the last fully glued carton. Moreover, if there is a problem or jam at one conveyor position, all conveyor "elements" are, or must be stopped, inherently.

Also, it may be desirable to operate a product or carton or conveyor element at one speed through one area and at another speed or stop at another area. In the past, this has been possible, if at all, only through very limited ranges or areas, since motion of one conveyor element or component necessarily is linked to and subject to the motion or phase or cycle of that conveyor at another point.

Thus, the combination of both asynchronous motion and synchronous motion and all the benefits of such motions in single conveyor path are only possible in the past, if at all, through very limited ranges. Also, it can only be accomplished within the limitations of overall conveyor system inertia, which is typically a function of the sum of all conveyor elements and whatever conveyor mechanisms are employed.

Likewise, in a product handling mode, such as weighing, a receptor conveying problem can cause or require load rejection and waste due to conveying aberrations unrelated to the actual weighing or product receiving operation. A receptor might receive no load, or a double load, for example.

These are but a few examples of the potential problems or difficulties inherent with typical conveyance or handling systems where the conveyor elements are inherently linked or coupled to a common drive through most of their path.

Accordingly, it is desirable to overcome these and similar difficulties in product packaging, cartoning and product handling methods and apparatus, now susceptible to these problems, and to offer at least more windows of opportunity for such difficulties to be cleared, or operational benefits to be provided.

SUMMARY OF THE INVENTION

To these ends, the invention contemplates a packaging system wherein operative elements can be moved through a path asynchronously with respect to operatively adjoining, but externally controlled elements or functions, except in a selected path portion where the elements are registered and synchronized with the adjoining or external elements or function. For purposes of this application, it is useful to refer to the elements or functions as responsive to an "external axis" which provides a signal defining at least one of the position, velocity and/or acceleration parameters of the adjoining external element, function or system. Thus, the invention in one aspect contemplates asynchronous operation in a path of a plurality of independent elements and the operation and control of some, but not all of these, in a selected portion or section of a path by its drive but in response to a signal from an external axis.

Generally, this involves the registration of certain of the elements in a path with operatively adjoining or external elements or functions by way of synchronization of them in the parameters of position, velocity and/or acceleration. Thus, according to the terminology used herein, the invention contemplates registration of certain elements, moving in a path and operating independently of other elements in the path, with operationally adjoining or external elements or functions by synchronization through the influence of an external axis signal from the adjoining system.

Stated with reference, for example only, to a packaging system, the invention in one embodiment contemplates a conveyor having a plurality of first elements moving or driven in a path, independently of each other, a second conveyor having a plurality of second elements moving or driven in a second path independently of each other, the two paths extending through a common area in which the first and second paths are operatively juxtaposed for a packaging function and one or more of said first elements in said path in said area being driven independently of other first elements in said path but outside said area and in a machine direction in synchronization with selected ones of said second elements in said second path in said area.

The invention thus contemplates packaging, cartoning and product handling apparatus wherein elements of a conveyor are not permanently linked or coupled by a common drive, but where each element can be driven in an element path independent of the condition or motion of other elements in the same path. No longer will movement or stoppage of one element cause or require movement or stoppage of another element in the same path. Some elements, individually or as groups, can be slowed, stopped or accelerated wholly independently of those same parameters associated with other elements in the path.

Thus, both synchronous and asynchronous motion can be accomplished in the same conveyor path with elements, cartons and articles, each driven wholly independently of like components in the same path. Said in another way, independent elements in one path are, in a selected portion of that path, synchronized by the common drive for elements in that path with another packaging operation under the influence of an external axis signal from that other operation, without also affecting the position or movement of other elements not in the selected portion of the one path. Stated in yet another way, the invention contemplates a packaging process wherein selected elements moveable independently in a path are made synchronous in a portion of the path to an external axis signal and independently of other elements in the path.

In this manner, carton lugs can be slowed or stopped to allow operable indexing with a slowed or stopped article bucket to enhance the transfer. At the same time downstream, carton lugs can be accelerated, slowed or stopped for carton closing or gluing without requiring stopping, acceleration or slowing of upstream elements where cartons are loaded. And, after carton discharge, lugs can be accelerated to pick up new carton blanks.

At the same time, the article bucket elements can be similarly independent, for accommodation of carton loading bucket discharge or for accommodation of bucket filling at another path position, and independent of the motion status of other bucket elements in the path.

In a product handling application, product receptors such as dump buckets may be positioned under net weigh scale discharge points and retained there for proper weight discharges independently of the status of other dump buckets in other positions on the same path, such as at filler wheels or the like.

Accordingly, the invention contemplates the use of one or more conveyor paths, wherein at least one conveyor path is defined by movement of elements driven or positioned in or through said path independently of other elements in the same path and the motion of certain elements in a path is under the influence of an external axis. These are applied, according to the invention, in the packaging, cartoning or product handling fields to overcome prior inherent disadvantages or obstacles therein, and to provide enhanced packaging, cartoning and product handling operations.

In an even more specific example, the invention provides, for example, split operation for glue cycle completion. There will be absolute control of complete carton gluing. In the event of a loading jam, cartons with good loads will continue to travel through gluing, completing the process without unglued flaps. Upstream portions of transport will be stopped prior to gluing. Lugs which are part of the gluing process will cycle through to discharge and be subsequently queued on the return portion of the lug circuit or path.

Cycle stop flap closing and emergency stop flap closing have long been machine features which are required by users. Its effectiveness has also been less than perfect in emergency stop situations. The split operation described above according to the invention will perfect the functionality of this feature for both emergency stop and cycle stop situations.

The invention enhances many carton operations, including: horizontal product transfers; vertical product transfers; floating bucket systems; floating carton systems; scale interface systems; and flexible carton transport systems.

Accordingly, it will be appreciated that the invention contemplates a packaging operation in which article or package conveying elements in a conveyor path are moved independently of others in the path, even asynchronously, until brought under the influence of an external axis, synchronizing them with another packaging function or apparatus.

Further, the invention contemplates a material handling process and apparatus wherein first and second separate conveyor paths are operably juxtaposed, each having respective first or second elements independently driven respectively in said paths wherein there are four possibilities of control and coordination of elements of one path from the external axis represented by the other path:

First: asynchronous elements are synchronized with synchronous elements;

Second: synchronous elements are synchronized with asynchronous elements;

Third: synchronous elements are synchronized with synchronous elements; and

Fourth: asynchronous elements are synchronized with asynchronous elements.

The invention thus contemplates the operative linking of a synchronous system with an asynchronous system, two synchronous systems or two asynchronous systems, one being at least partially brought under the influence of an external axis represented by the other.

For example, an independently movable element system with packaging elements is synchronized under the influence of an external axis or external event occurring in another operable packaging system.

For further example, the position, velocity and/or acceleration of one independently moveable element in a packaging system, driven by a drive common to all such moveable elements, is influenced by an external axis or an event in another packaging system.

For further example, one system of elements is event-driven and another system of elements is synchronized to the one system through its external axis. The system representing or presenting the external event or external axis can itself be an independently movable element system, element conveyor, packaging function, encoder, vision system, photo-eye, proximity switch or the like.

It will, of course, be appreciated that the invention has particular application in the package field where articles or products are transferred into packages such as, but not limited to, pouches, trays or cartons, for example. The packages or cartons are formed, filled and/or sealed on a high speed basis, either intermittently or continuously.

Stated then in yet another way, the invention contemplates the packaging of articles through the use of linear motors driving at least one of an article or group of articles or packages and registering and synchronizing one of those with the other in position, velocity and/or acceleration in a machine direction under the influence of an external axis from the other.

The invention thus contemplates driving a plurality of cartons and/or article buckets through the use of a linear motor to accomplish these aforesaid objectives. The application of a linear motor to a cartoner, for example, in this fashion, provides advantages not before obtained in such packaging systems.

While the term "synchronization" is used herein to described the relative position, velocity and/or acceleration of an element with respect to another element or function, it will be appreciated that it is desired to render an element "position synchronous" with another element or function. That criteria includes the circumstance of both position and time, and it will be appreciated the circumstances of position and time subsume the parameters of both velocity and acceleration. Accordingly, the invention contemplate a packaging system wherein a plurality of elements in a common path are, in at least a section of the path, moved independently of other elements in the path in a position synchronous mode under the influence of an external axis signal.

These and other objectives will become readily apparent from the following detailed written description and from the drawings in which:

BRIEF DESCRIPTION OF THE DRAWINGS

FIGS. 3-D through 3F show details of the end turn of FIG. 3C;

Figure 1:
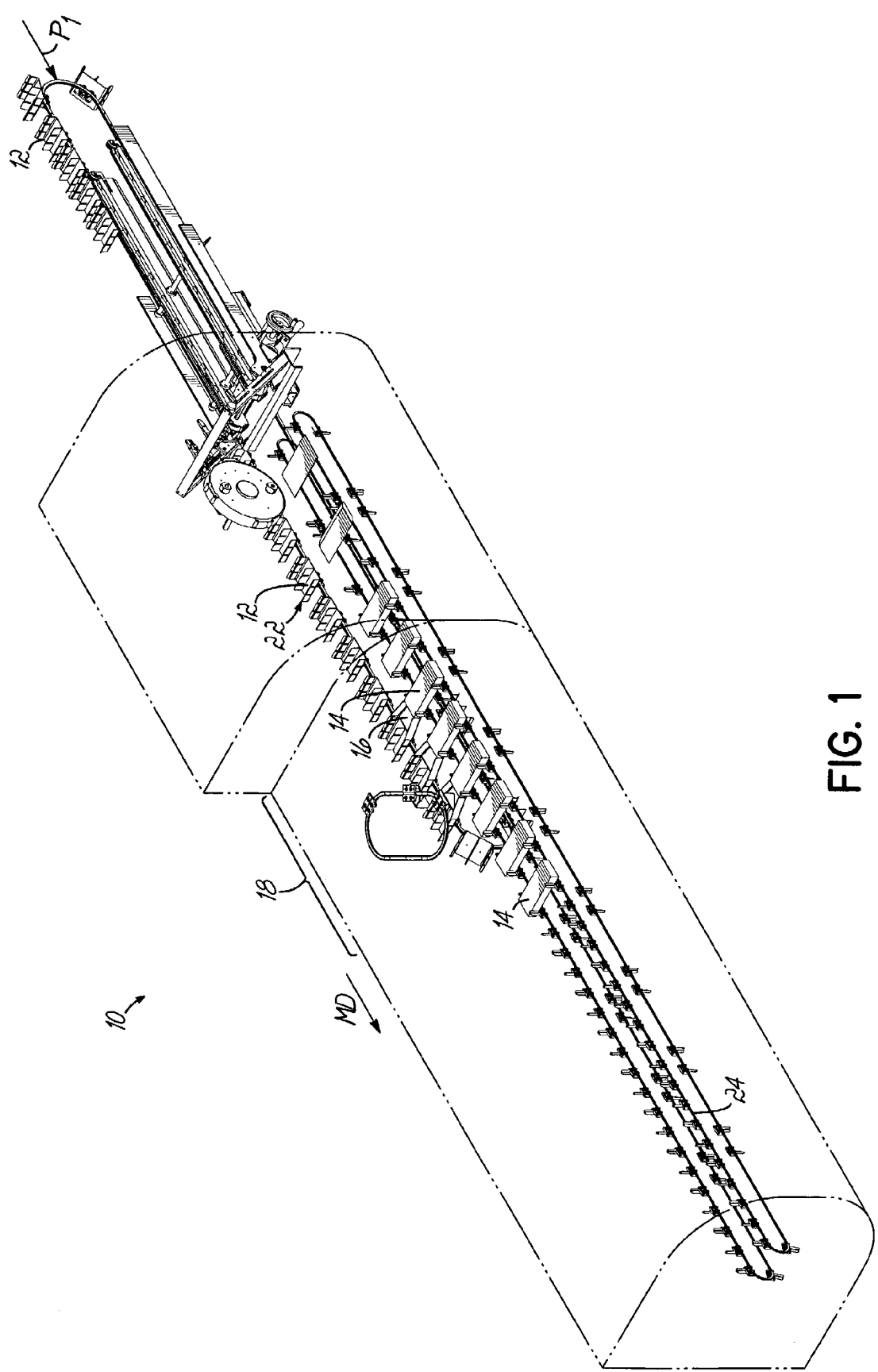
FIG. 1 is a perspective view of a cartoner according to the invention having article trays driven right-to-left by a linear motor and from which articles are transferred into cartons, also transported right-to-left by lugs driven by a linear motor.

It will be appreciated that the invention is useful in many kinds of packaging operations, including but not limited to pouching or cartoning where products, items or articles are transferred into packages which are closed then transported for use. In such processes, the invention is useful in synchronizing the elements of two operationally joined systems, one to the other, so that an article can be registered with a package, for example, or a package can be synchronized with a sealing function, for example, independently of other articles or packages moving in the same path, and under the control of an external axis represented by the operationally adjoining system.

Thus, the following detailed description of specific embodiments of the invention is by way of example only.

Moreover, it will be appreciated that while linear motor technology is contemplated by the invention to carry out its objectives, the structure, form or control of the linear motors used do not in themselves constitute any part of the invention. Any suitable linear motor system can be used to accomplish the objectives of the invention consistent with this disclosure.

Linear motor technology is well known. Information concerning such technology can be found in many sources. As an example, disclosures concerning linear motor technology can be found in Patent Cooperation Treaty (PCT) Applications as follows:

| SER. NO. | INTERNATL PUBLICATION NO. | PUBLICATION DATE |
|---|---|---|
| PCT/US00/11345 | WO 00/64751 | Nov. 2, 2000 |
| PCT/US00/11346 | WO 00/64753 | Nov. 2, 2000 |
| PCT/US00/11361 | WO 00/64742 | Nov. 2, 2000 |
| PCT/US00/11342 | WO 00/64791 | Nov. 2, 2000 |
| PCT/US00/32120 | WO 01/38124 | May 31, 2001 |

Each of these applications is herewith expressly incorporated herein by reference as if fully reproduced herein.

Also, further information concerning linear motor technology can be found in the following publications:
a. Technical Papers, *Distributed Control of a PM Brushless Motor With Multiple Moving Elements*, by Wayne Robinson and Rob Lankin, Agile Systems, Inc., Waterloo, Ontario, Canada, January 2001, 6 pages (see www.agile-systems.com/databook/)
b. Brochure entitled, *High Speed Assembly Automation System*, 5 pages, by Lanco and MagneMotion, 2001
c. Brochure entitled, *Automation Tooling Systems Automation, Supertrak* by Automation Tooling Systems of Ontario, Canada, 2001, 4 pages.
d. Webpage entitled, *Supertrak: Linear Motor Conveyor Systems* by Agile Systems 2001, 3 pages (www.agile-systems.com)
e. Brochure entitled, *Automation Tooling Systems Automation SUPERTRAK TM Modular Conveyor System* by Automation Tooting Systems of Cambridge, Ontario, Canada, 2002, 6 pages Each of said publications is herewith expressly incorporated herein by reference as if fully reproduced herein.

Also, information concerning linear motor technology is also found in the following two U.S. Pat. Nos. 6,011,508 and 6,191,507, each of which is herewith expressly incorporated herein by reference as if fully reproduced herein.

It will be appreciated that, according to the invention, given the parameters of step and direction as an external axis from the adjoining system, any such linear motor control can be brought under the influence of an external signal to register and synchronize the elements driven by the linear motor in an operably adjoining area with elements of an adjacent packaging system to carry out carton loading ,product feeding into buckets or the like Turning now to the drawings, the invention is depicted therein in particular application to various packaging or cartoning operations. In one embodiment, the invention contemplates the use of a linear motor as the driver for independently driving a plurality of elements such as buckets, lugs, sets of lugs, product receptors or the like, in a common path. Each such element is driven, and controlled, independently of other elements in the path, but selected elements in selected path sections are driven by the linear motor under the influence of an external axis signal in register and synchronization with components of the adjacent system generating such external axis.

It will be appreciated that the term "elements" is broadly and conceptually used herein to refer to a moveable site, bucket, lug, paddle, tray, pusher, receptor, or other conveyor device for handling products, articles, items, packages, pouches, cartons or the like. The term "external axis" or "external event" has the same conceptual meaning as noted above and includes, but is not limited to, a control signal, position, acceleration, velocity, or happening in a separate handling or function system other than that ordinarily controlling the elements in one path or system.

Thus, the elements of one system, conveyor, linear motor path or the like can, according to the invention, be brought under the influence of an "external axis" or "external event" in a section of their paths to, for example, be registered or indexed, and synchronized in position, velocity and/or acceleration with one element or function of a different system.

Linear motors per se are well known, but have not heretofore been applied to operationally adjoining conveyor systems to receive groups of articles or to combine them into cartons as described herein.

The invention thus contemplates moving magnet linear motor technology with unique application where magnets, carts, elements, buckets, lugs, lug sets, product receptors and the like are passive, requiring no tether wires for power or position feedback. Each element is provided with a magnet and is independently driven by the linear motor, moving along a series of stationary coils, providing substantial advantages over conventional transport systems. Conventional transport systems typically employ chains, sprockets, belts, racks, gears, lead screws, etc., none of which conveniently lend themselves to independent control of the elements.

Another benefit of the moving magnet linear motor technology is the reduction of system inertia. Since each element is independent, the inertia of the system is only that of the individual element and its payload. In conventional transport systems, the elements are generally interconnected through a transmission. The interconnection and the addition of the transmission substantially increase the inertia of the system, which is a composite, then, of all elements in the system and the drive of that system. Lower inertia provided by the moving magnet linear motor system invention provides the basis for higher speeds and greater efficiency in packaging, cartoning and product handling environments, not before available.

Suitable linear motor systems from varied sources can be used in carrying out the invention. One particular form of linear motor apparatus found useful in the packaging application of the invention is that known as the "SUPERTRAK" system by Automation Tooling Systems of Cambridge, Ontario, Canada. This is further described in U.S. Pat. No. 6,191,507. According to the invention, such a linear motor system is provided with any form of suitable control which is operable to drive and synchronize the individual elements of the system in a zone, section or segment of the track under the influence of an external axis, as described herein. Once the parameters of the invention described herein are known, such a system is controlled to provide such parameters in a packaging process. In this system, for example, microcontrollers for zones may be networked with a CPU or other form of controller with input from an external axis to not only provide a linear motor system with high position accuracy, but to control individual and independent elements responsive to or under the influence of an external axis.

Another form of linear motor system used according to the invention is by MagneMotion, Inc. of Acton, Mass. See also U.S. Pat. No. 6,011,508 for such linear motor system. Each system can be adopted to be brought under the influence of an external axis. In such systems, an indefinite length track defines an extended linear motor represented by coils, one or more of which define a zone of the track. Individual elements, each having magnets thereon, are driven along the track and the zones or coils, according to the invention, and controlled by the linear motor controller in any suitable way, such as through a CPU, to bring an individual element, independently of others on the track, under the influence of an external axis. Such axis might take the form, for example, of one or more encoders, vision systems, position sensors, control or any other position and/or timing signal of an operably adjoining synchronous or asynchronous system.

Referring now to FIG. 1 of the drawings, there is depicted therein a cartoning apparatus 10 according to the invention. In use, products, items or articles (not shown) comprising respective loads are carried singly or in groups of a plurality of respective trays or buckets 12 in the machine direction of arrow MD. The buckets are registered and synchronized with a plurality of erected cartons 14, which also move in the machine direction MD, so that the products, items or articles are transferred, such as by pushing, through funnels 16 into the erected cartons 14. This indexing and transfer takes place throughout area 18 wherein the paths of the buckets 12 and cartons 14 operationally coincide, i.e. are operably juxtaposed, so the buckets 12 can be synchronized with the motion of the cartons 14 and the load transferred. In this regard, and in other embodiments described herein, it will be appreciated that the elements of a linear motor system are brought under the influence of an external axis where the elements are first registered with, then synchronized operably in position and time with an element of an adjacent conveyor system by way of influencing the linear motor drive for such elements with an external axis of the adjacent system. Given the step and direction, for example, of the adjacent system elements, the linear motor and its control registers and synchronizes each element in an operating zone with the adjacent system and independently of other elements driven by the linear motor.

Thereafter, the cartons are transported in the direction MD, wherein they are finally sealed and discharged. Such an operation, wherein similar buckets and cartons have been traditionally conveyed and indexed in the past described, for example, in U.S. Pat. No. 6,105,338, which is expressly incorporated herein as if fully reproduced herein.

Figure 4:
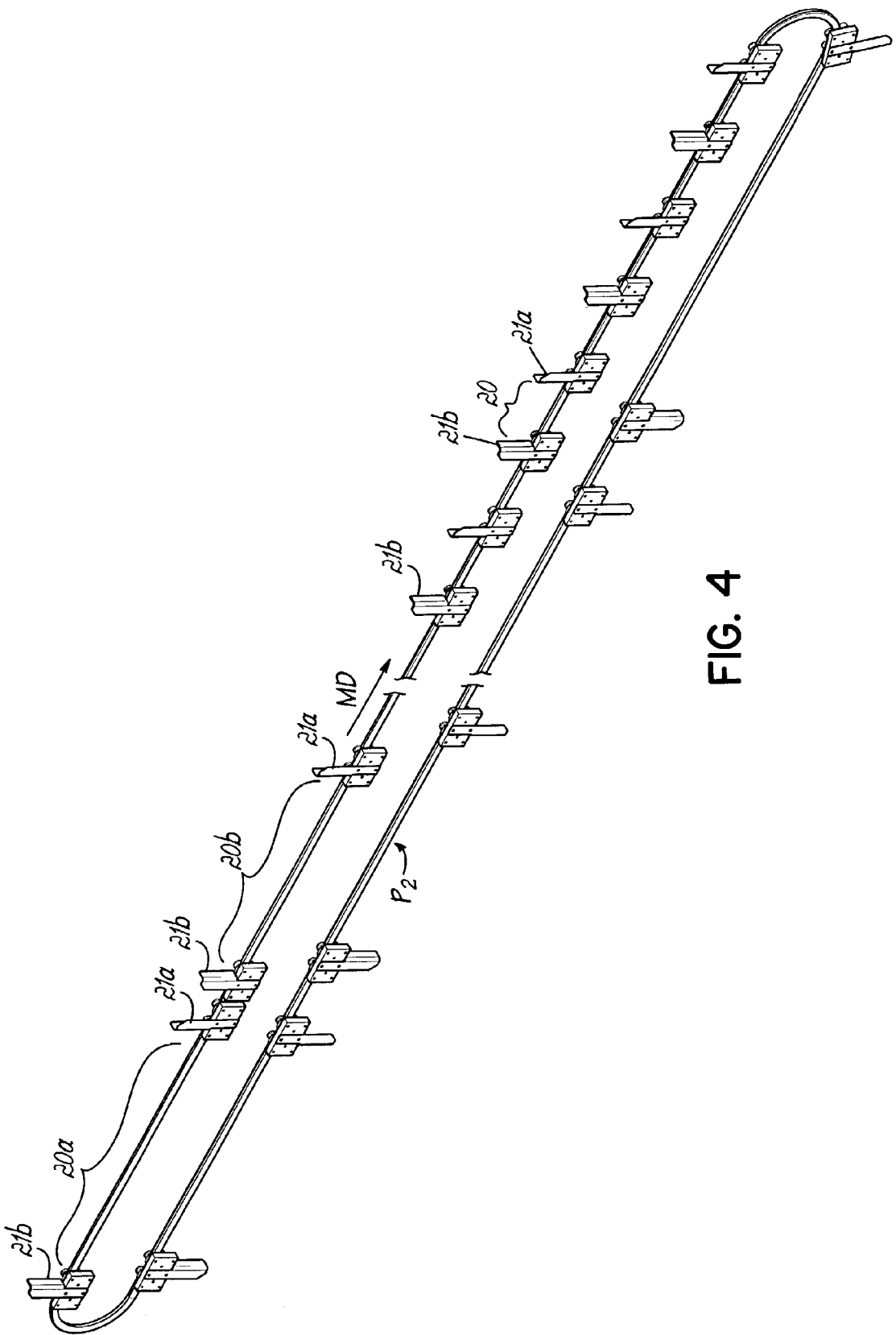
FIG. 4 is a perspective view of a carton transport according to the invention where each carton lug or each carton lug set is driven in a path independently of other carton lugs by a linear motor.
Figure 4A:
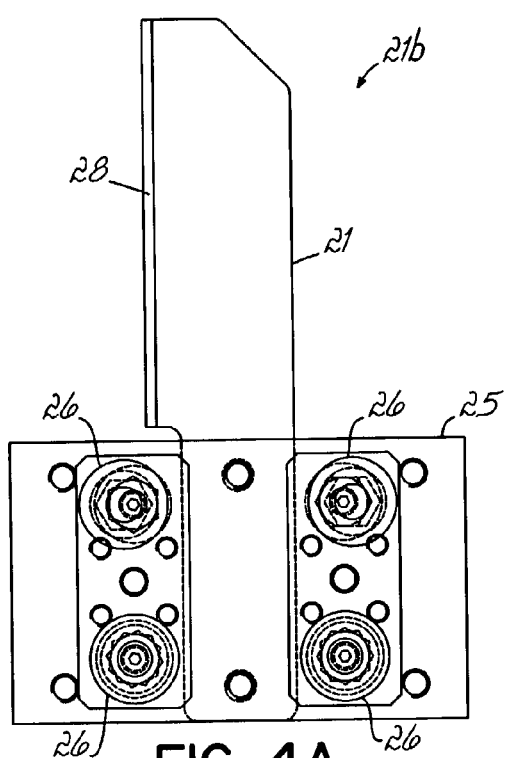
FIGS. 4A–4D show elevational and perspective details of carton lugs of FIG. 4.
Figure 4B:
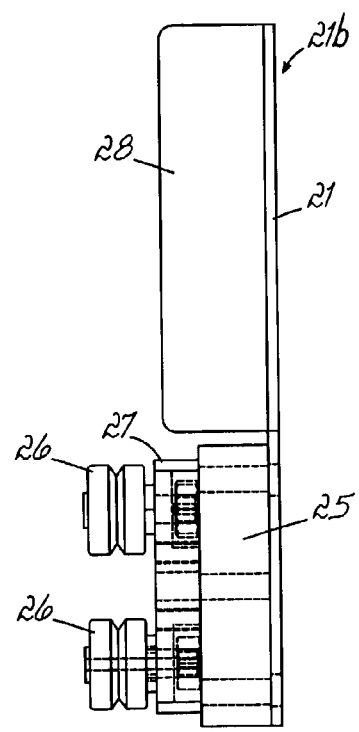
Figure 4C:
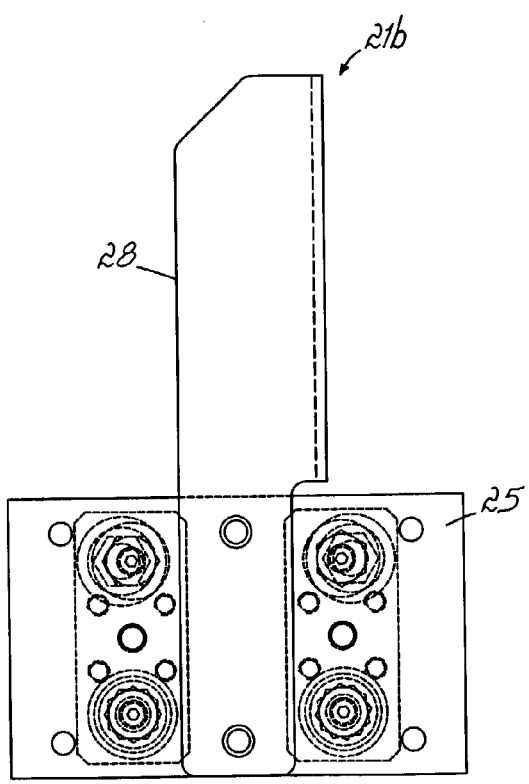
Figure 4D:
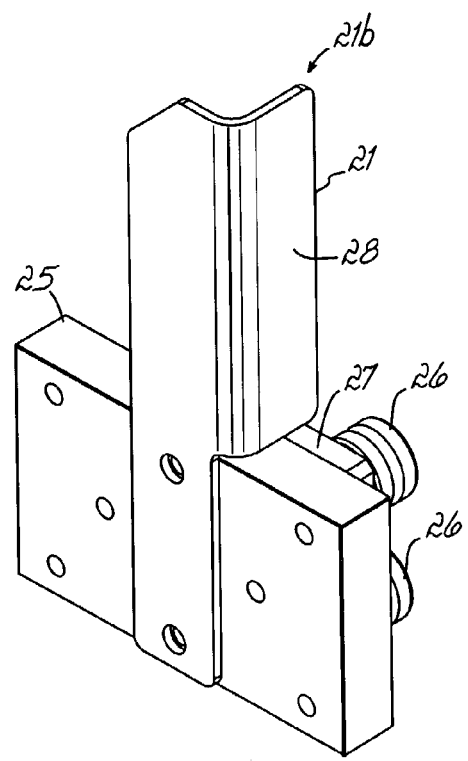

In accordance with the invention, however, it will be appreciated that the buckets and the sets of lugs 20 (FIGS. 4–4E) which move the cartons are each preferably driven by respective suitable linear motor, represented, for example, at 22 for the buckets and at 24 for the lugs (FIG. 1). Accordingly, as all the buckets 12 are moved through their oval path P (FIG. 1), all the buckets 12 are driven in said path independently of each other by the linear motor. Path $P_1$, of course, runs through area 18. Thus, one bucket can be driven at a velocity, acceleration or to a position independently of the velocity, acceleration or position of any other bucket in the path (allowing, of course, for collision avoidance). Likewise, the lug sets 20, including leading lug 21a and trailing lug 21b are each driven independently of each of the lug sets moving in the same oval lug path $P_2$ (FIG. 4). Path $P_2$ also runs through area 18.

This is particularly useful in area 18 (FIG. 1) where the buckets 12 are registered and synchronized respectively with cartons 14 for load transfer. More particularly, the buckets 12 are respectively synchronized with carton 14 in position, velocity and/or acceleration so the loads can be transferred into the cartons. In order for this to occur, one or more of the buckets 12 in area 18 are driven by linear motor 22 under the influence of an external axis represented by the lugs 20 and their drive. Thus, independently of other buckets 12 in Path $P_1$, buckets 12 in area 18 are registered and synchronized with cartons by the demands of an external axis represented by a position signal for the system of lugs 20, with lugs 20 and cartons 14 therein for loading.

More particularly, a bucket 12 in area 18 is synchronized with a carton 14 in a lug set 20 in position, velocity and/or acceleration of the carton 14 in lug set 20, so the bucket 12 is driven by its associated linear motor under the influence of, the external axis or event represented by the lug sets, and independently of any other bucket 12 in Path $P_1$.

This has enormous operational advantages in a packaging environment. For example, if the infeed of a load to buckets 12 in Path $P_1$ upstream of area 18 is stopped or changed, downstream buckets in area 18 can still be synchronized with cartons 14 so that loading and downstream carton filling and sealing is not interrupted. Once the infeed process is equalized, buckets 12 can be independently rushed to area 18 to continue the load transfer process.

Similarly, if there is a downstream stoppage of cartons 14 and lugs 20, for example, filled cartons can be independently moved through the carton gluer, then accumulated, so the gluing process is not interrupted causing carton rejection due to incomplete gluing or sealing. In this condition, of course, certain of the lug sets 20 in the Path $P_2$ are, for a selected path segment, brought under the influence or control of an external axis or event represented by a downstream system such as a carton gluer, discharge or the like, and independently of other lug sets 20 in Path $P_2$.

Moreover, it will be appreciated that while the cartoner 10 is preferably provided with linear motor drives for both cartons 14 and load buckets 12, one of these may be driven synchronously by a conventional conveyor and another by a linear motor as described above.

Accordingly, if the lug sets 20 are carried on adjustable chains moving synchronously as in conventional cartoning, the buckets 12 moving asynchronously on Path $P_1$ are nevertheless in area 18 registered and synchronized under the influence of and with the synchronous external axis of the lug conveyor.

This could of course, be reversed, with buckets 12 carried on the chains of a conventional conveyor and lug sets 20 moving asynchronously in Path $P_2$ but nevertheless synchronized in area 18 with the buckets 12 under the influence of the external axis of the bucket conveyor.

Also, it should be appreciated that the two independent linear motor systems 22, 24 could be operated so all respective buckets and carton conveying lug sets are moved independently in their paths but are synchronized in their respective paths under the influence of an external axis represented operationally by the adjacent system.

Thus, it will be appreciated that the invention contemplates two operationally adjoined or juxtaposed systems where asynchronous elements are synchronized with synchronous elements, where synchronous elements are synchronized with asynchronous elements; where synchronous elements are synchronized with synchronous elements; or where asynchronous elements are synchronized with asynchronous elements, with one set or system of elements being brought under the influence of the external axis signal provided by the adjoined or juxtaposed system.

Figure 4E:
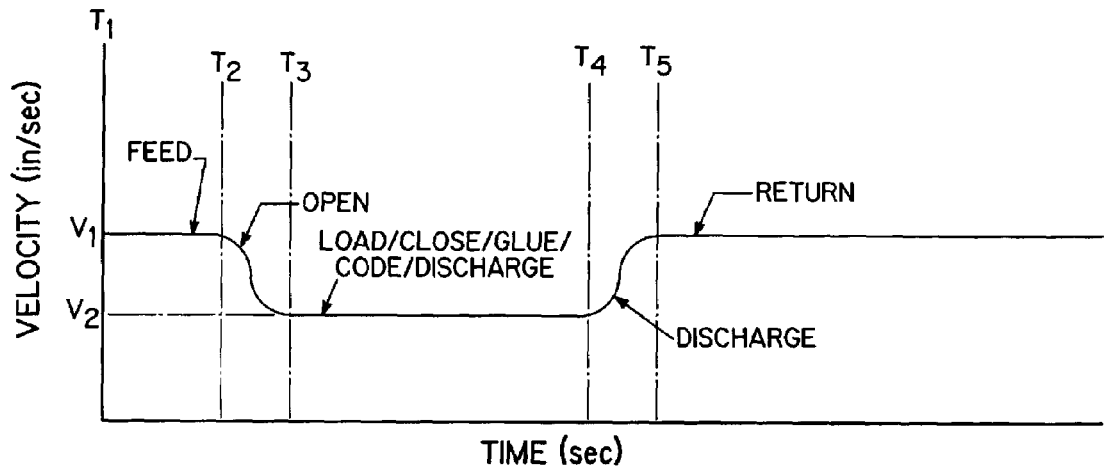
FIG. 4E is a time/event graph showing how the independently driven lugs of FIGS. 4 through 4D can be controlled to produce carton movement independently of other cartoners or lugs in the same path.
Figure 4F:
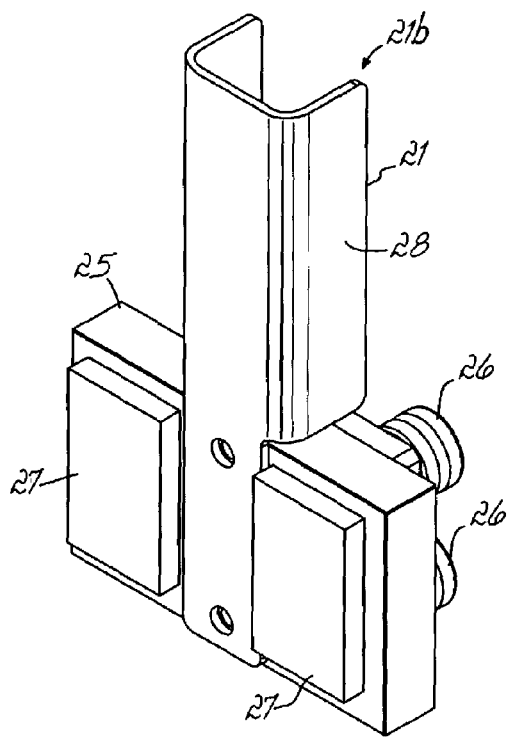
FIG. 4F is a perspective view of a lug unit having both leading and trailing lugs.

Turning now to FIGS. 4–4E, details of the lug sets or lug elements 20 and their operation are described. FIG. 4 depicts a plurality of lug sets 20, each including leading lug 21a and lug 21b. All the lugs 21a, 21b are mounted for independent movement in a Path $P_2$ defined by coils of a linear motor (not shown). Each lug 21a, 21b of each lug set 20 is driven independently of each other lug, although one leading lug 21a and one trailing lug 21b are typically conducted or synchronized in association to form a lug set 20 for erecting and carrying a carton 14 (see FIG. 1).

As depicted in FIG. 4, the respective lugs 21a, 21b can each be driven independently in a recirculating Path $P_2$, for example, while the lugs 21a, 21b of lug sets 20 are coordinated to carry a carton therebetween, lugs 21a, 21b of lug set 20a are spaced further apart for receiving a not fully erected carton blank. Lugs 21a, 21b are shown closing together with lug 21b accelerating toward and independently of lug 21a to erect a carton blank and thus to form lug set 20(b) and then later the lugs are finally positioned as in sets 20, to hold and convey a loaded carton therebetween.

The carton blanks in lug sets 20a, 20b are progressively erected into squared up or erected cartons as the trailing and leading lugs 21b, 21a close together. Thereafter, each closed lug set 20a is driven independently of any other lug set through an operative or upper run of Path $P_2$ and is returned or recycled through a lower return run of Path $P_2$. It will be appreciated that lug sets 20 can be driven, independently of other lug sets in Path $P_2$ and under the influence of an external axis represented or imported by an adjoining or juxtaposed packaging system or event. Preferably, lugs 21a, 21b are returned in the return path $P_2$ at a different pitch than when erecting or conveying cartons. When they reach the area in Path $P_2$ for receiving another carton blank, the linear motor driving them is operable to space them widely apart for receiving the blank, then to accelerate a lug 21b independently toward a lug 21a to close the separation distance and erect a carton.

Details of one lug 21b for example, are shown in FIGS. 4A–4D. Each includes an upstanding lug 21 mounted on a carriage 25 carrying rollers 26 for supporting the lug 21 on a track portion ($P_2$) of a linear motor. A magnet 27 is disposed on each carriage 25 and serves to pull the carriage through Path $P_2$ when coils of the linear motor are energized to move that carriage n a selected portion of the track or path.

Each lug 21 has a face 28 for engaging and pushing or receiving a carton (not shown).

FIG. 4E depicts a time/velocity graph for a lug as it moves from and at velocities $V_1$ and $V_2$. At time $T_1$ and velocity $V_1$, a lug 21b forms up behind a feeding carton blank. At time $T_2$, the velocities of the lugs 21 are such that the carton is erected. Between times $T_3$, $T_4$, the cartons are loaded. They are accelerated and discharged from times $T_4$ to $T_5$ and from time $T_5$ to $T_1$, the lugs move at $V_1$ or some other speed to return in their oval Path $P_2$ for recycle. Since $V_2$ is slower than $V_1$, the trailing lug 21b is accelerated, relative to leading lug 21a from time $T_2$ to $T_3$ to close up the separation and distance between the lugs and erect the carton.

Once the cartons are filled, sealed and discharged, first leading lug 21a at the time $T_4$ is accelerated away to recycle, followed by trailing lug 21b when it reaches its time $T_4$ The lugs may also be accelerated and conveyed at different velocities and pitches int eh return run.

In another alternate embodiment, it will be appreciated that a trailing lug 21b for one carton can be combined on a single carriage in a common form or unit 29 with a leading lug 21a for a succeeding carton. In this manner, one element of the linear motor system comprises a trailing lug 21b and a following leading lug 21a in a unit 29. This combined function lug unit 29 is driven in the recirculating path independently of all other such units, with the carton erecting and conveyor operation, and lug return, being similar to that described above.

In particular, one such leading unit precedes a carton blank, introduced there behind. A following unit then accelerates toward the leading unit; its trailing lug engaging and erecting the carton against the leading lug of the leading unit. As this following unit progresses, a succeeding carton is introduced, behind it,just preceded by the leading lug of the following unit. A succeeding unit closes up the space, erecting this carton between the leading lug of the following unit and the trailing lug of the succeeding unit.

Figure 2:
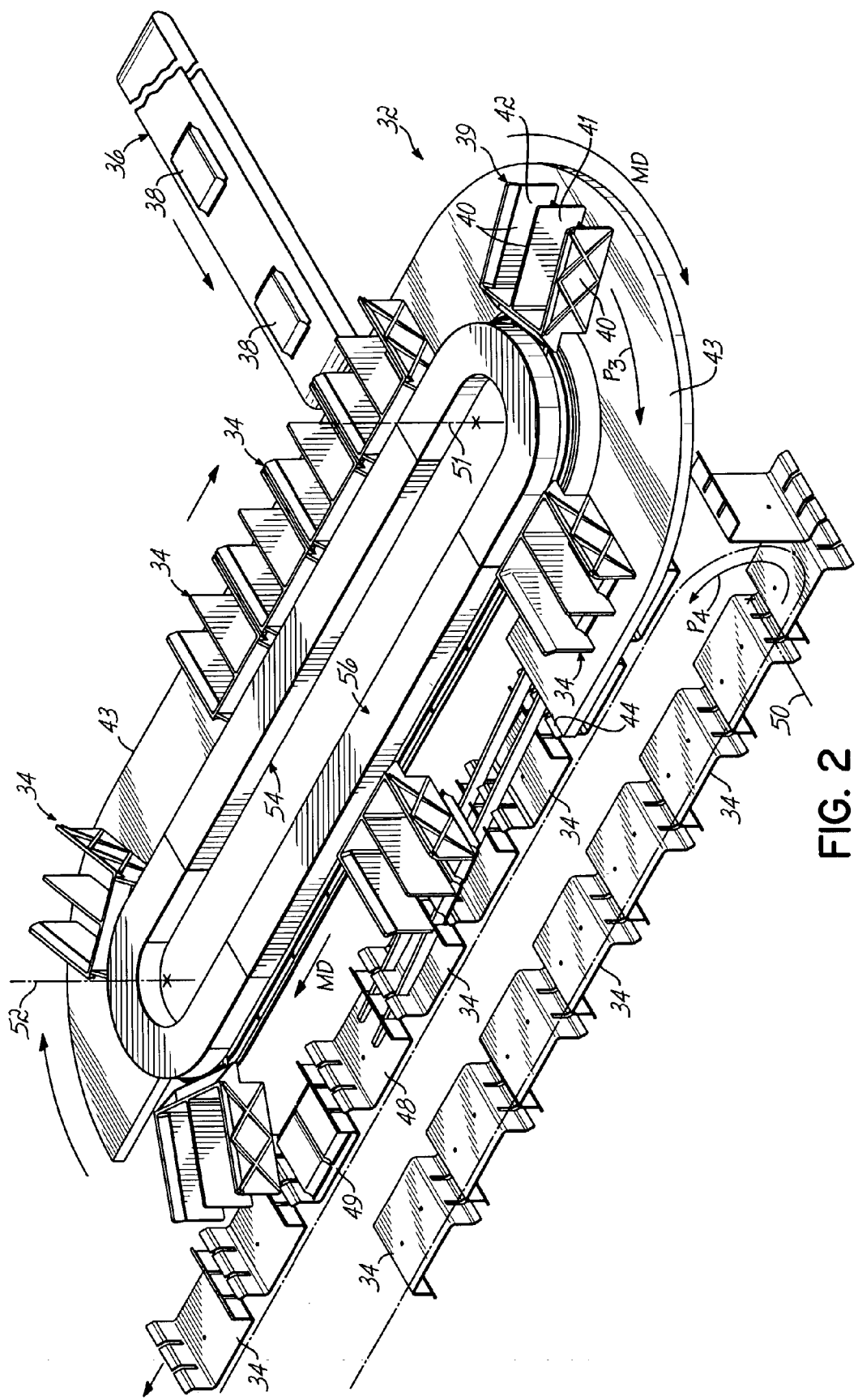
FIG. 2 is a perspective view of a horizontal product transfer according to the invention wherein product buckets or trays driven in a horizontal plane by a linear motor for receiving products from an infeed and discharging products to product buckets moving in a vertical plane, and also driven preferably by a linear motor, where all product buckets and trays as shown are each driven independently of other product buckets or trays in the same path.
Figure 2A:
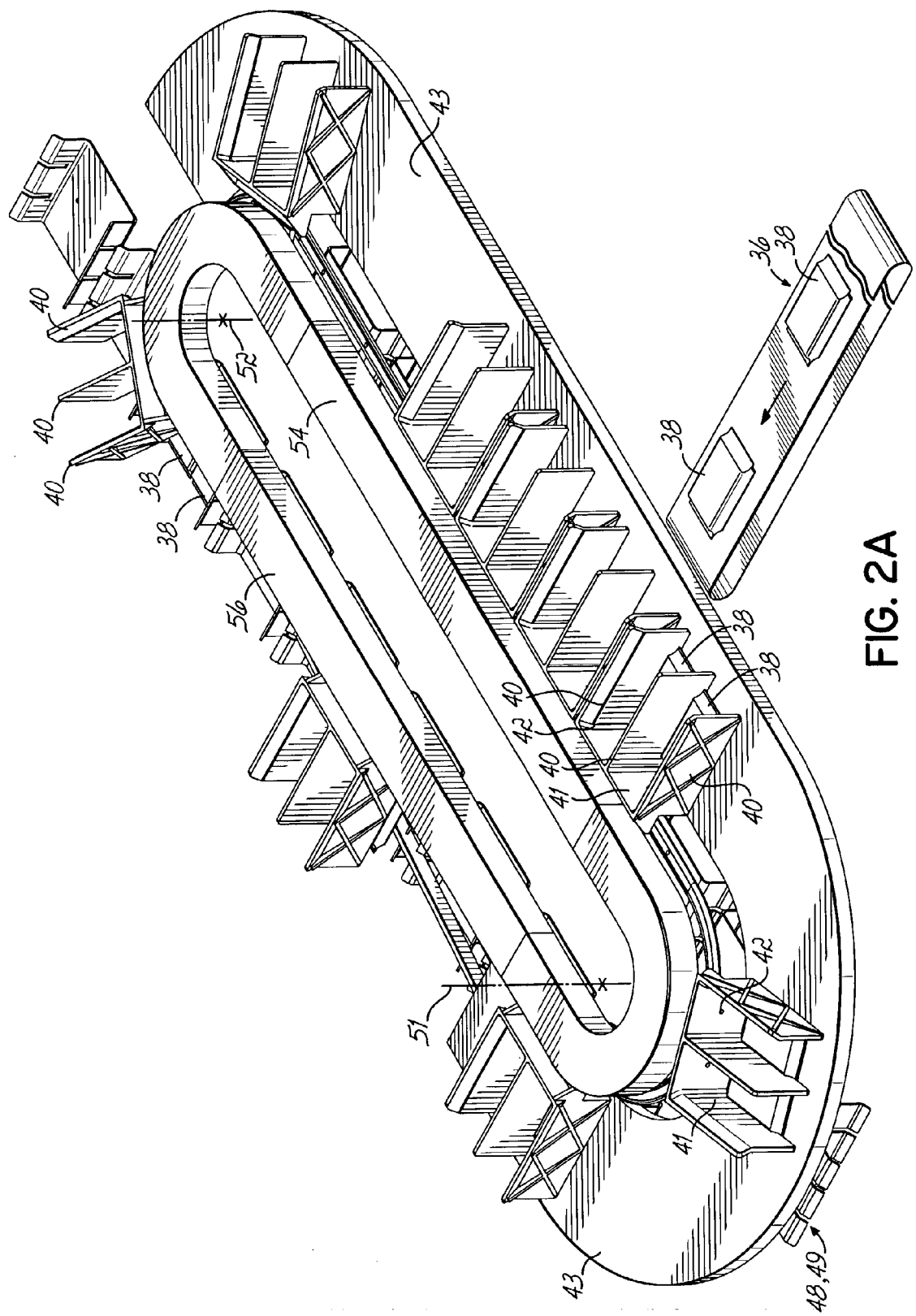
FIG. 2A is another perspective view of the horizontal transfer of FIG. 2, from the infeed side.
Figure 2B:
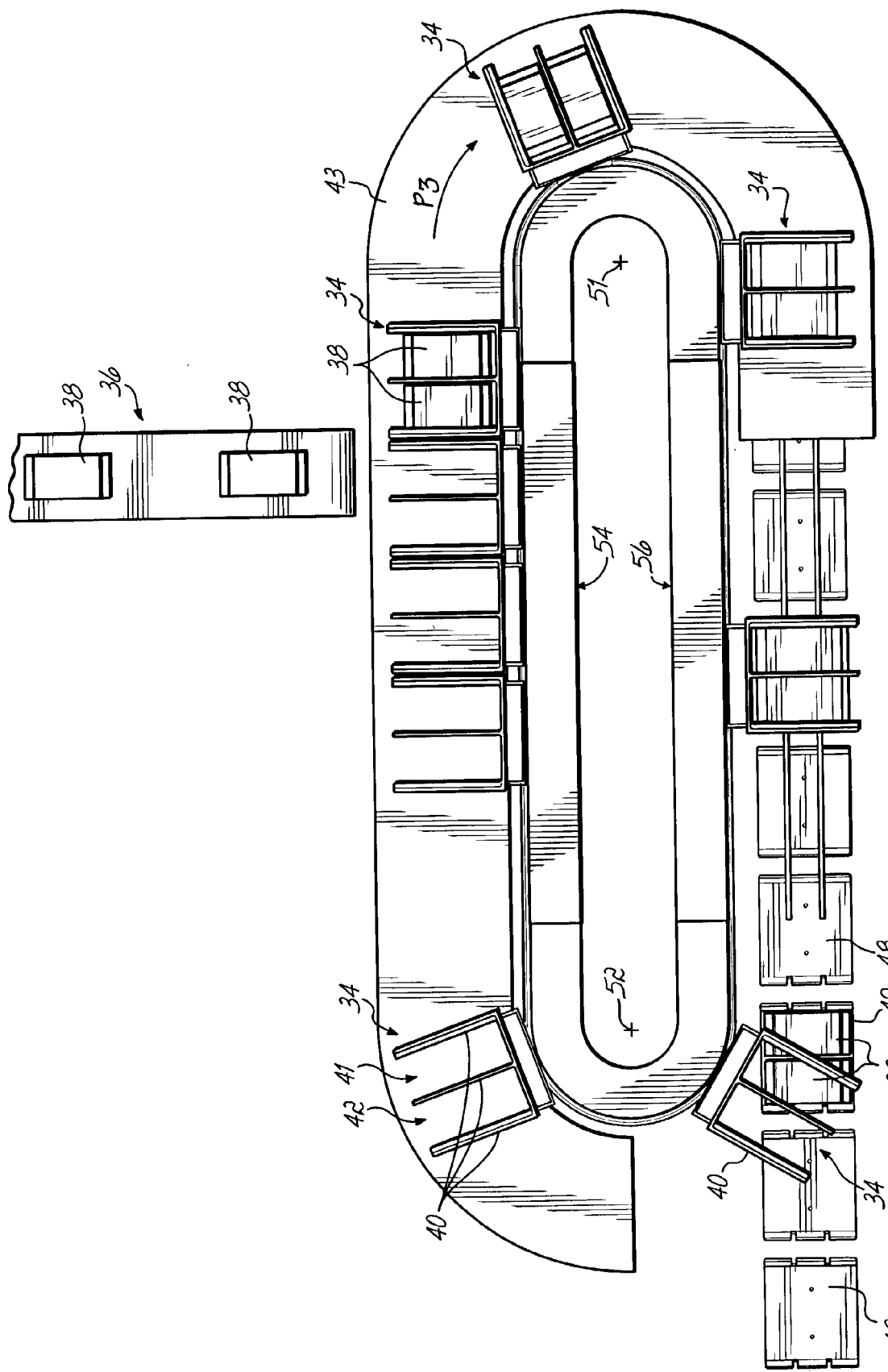
FIG. 2B is a plan view of the subject matter of FIGS. 2 and 2A.

FIGS. 2, 2A and 2B illustrate a horizontal product transfer according to the invention. In FIG. 2, a horizontal product transfer 32 feeds a product bucket conveyor 34. A product infeed 36 feeds products 38 toward transfer 32, having a plurality of product transfer buckets or elements 39 defined by paddles or walls 40. In this configuration, three walls 40 define two product receptors or spaces 41, 42 having open bottoms.

As these move in a horizontal plane around an oval path $P_3$, products 38 therein slide on plate 43 until they approach drop off edge 44. Guide rails 45, 46 then support the products 38 as they are transferred in machine direction MD until they drop from the rail ends into a bucket such as bucket 48. Two products 28 are shown in like bucket 49 for illustration, the buckets 48, 49 being buckets of a product bucket conveyor 34.

Buckets of conveyor 34 move in a Path $P_4$ about horizontal axes (50 is shown) while Path $P_3$ is oriented about vertical axes 51, 52. FIG. 2A illustrates the apparatus of FIG. 2 from a different viewpoint. FIG. 2B is a plan view of the embodiment of FIGS. 2 and 2A.

In this configuration, the horizontal transfer 32 feeds a continuous motion cartoner article bucket conveyor 34 wherein the buckets such as 48, 49 are connected and driven by a preferably continuous motion conveyor chain in a typical fashion.

The elements 39, however, are driven by linear motors such as depicted at 54, 56. These elements are registered then synchronized with the buckets of conveyor 34 according to the invention.

Linear motors 54, 56 may be extended around the end curves of Path $P_3$ or mechanical drives may be used in these semicircular path segments. One linear motor could be used, two (as numbered) or a plurality to define a Path $P_3$. In any event, elements or receptors 39 are each driven independently of each other through the extent of linear motors 54, 56 and in two areas are synchronized via an external axis. In particular, the elements 39 driven by linear motor 54 are synchronized with the belts of the product infeed 36 (or with product thereon) so that a receptor is in place and synchronized in position, velocity and/or acceleration to receive a first, then second article 38. Elements 39 will not move from the infeed until filled, assuring a two product fill for each bucket of the downstream bucket conveyor 34. Thereafter, the elements are moved through Path $P_3$ where they are driven by linear motor 56 where they are, in this section of Path $P_3$, registered and synchronized in position, velocity and/or acceleration, with a bucket 48 to drop products therein.

The motion of elements 39 then at the product infeed 36 and over the continuously moving receiving buckets of the conveyor 34 are independent in both operationally coordinated areas of Path $P_3$ of other elements 39 in other sections or areas of the path. Thus, the elements 39 in Path $P_3$ are driven asynchronously then synchronized with infeed 36 which may be delivering products 38 synchronously or asynchronously, and are then registered and driven synchronously with synchronously-driven buckets or conveyor 34.

It will be appreciated that bucket conveyor 34, while continuously and synchronously-driven in the foregoing illustration could be comprised of buckets themselves driven independently of each other by further linear motors according to this invention where its advantages were desired in that system. Such further linear motors could be controlled under the influence of a yet further external axis from a yet further adjoining operational packaging function or system.

And in any event, it will be appreciated that the elements 39 are brought under the influence of an external axis for synchronization twice in their travel around Path $P_3$, once under the external axis of the product infeed 36 and once under the external axis of the bucket conveyor 34.

Figure 3:
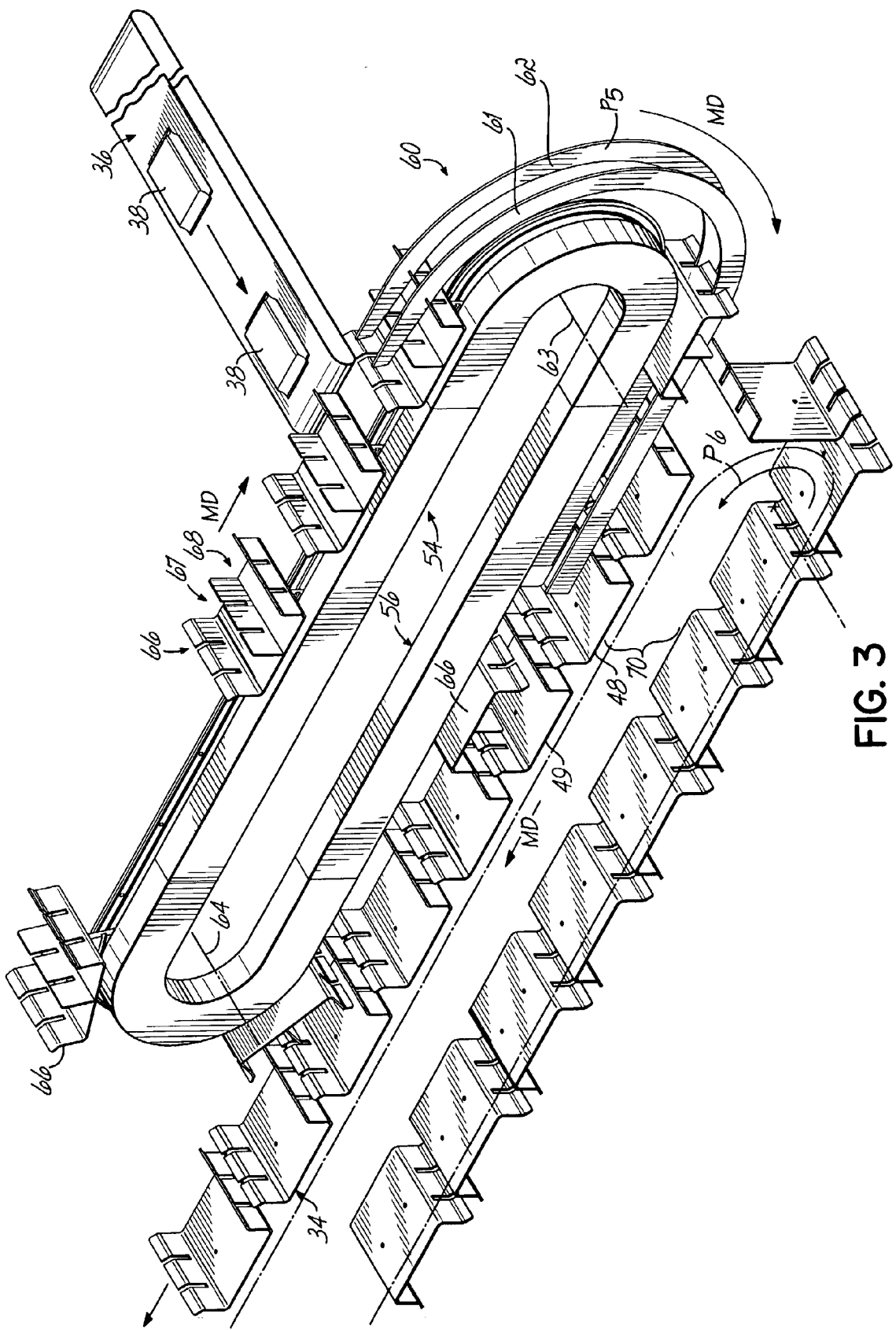
FIG. 3 is a perspective view of a vertical product transfer according to the invention wherein product transfer trays or buckets driven independently in a vertical plane by linear motors receive product from an infeed and transfer product to product buckets, driven in a second path and independently of each other, by respective linear motors.
Figure 3A:
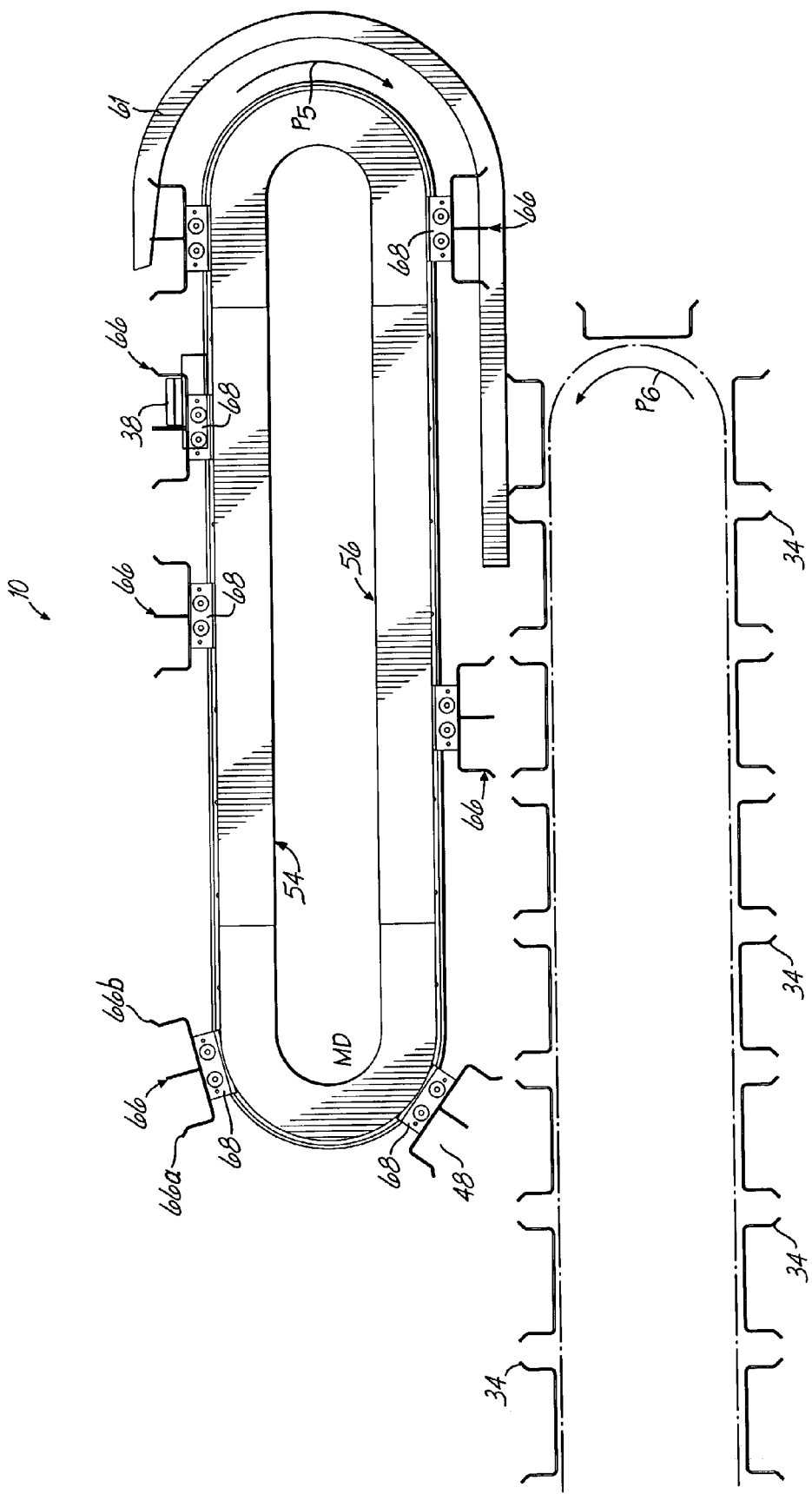
FIG. 3A is an elevational view of the invention of FIG. 3.
Figure 3B:
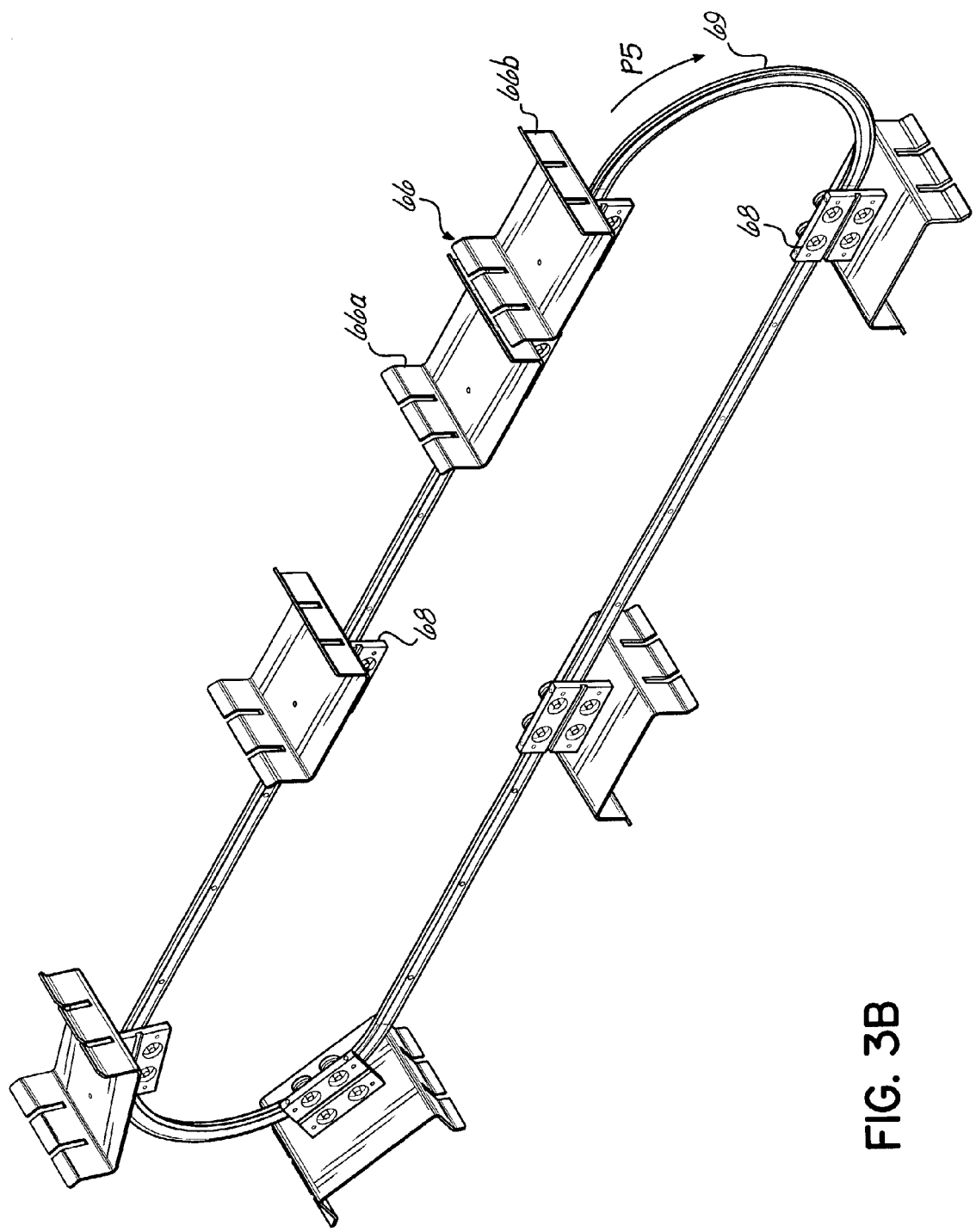
FIG. 3B is a perspective illustration of the vertical transfer of FIG. 3.
Figure 3C:
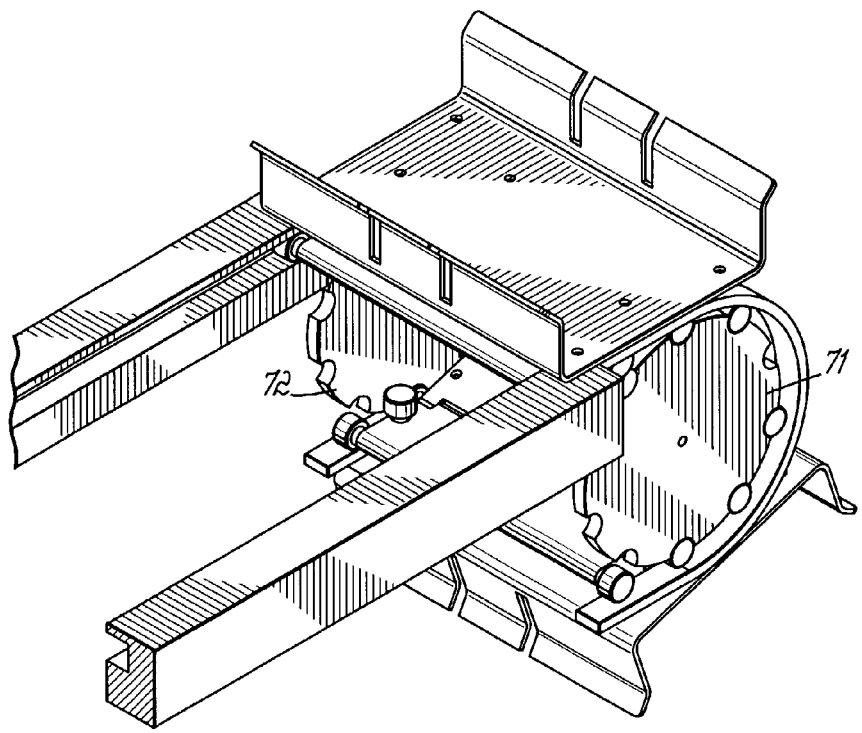
FIG. 3C is a perspective view of details of an end turn in the vertical transfer of FIG. 3.
Figure 3D:
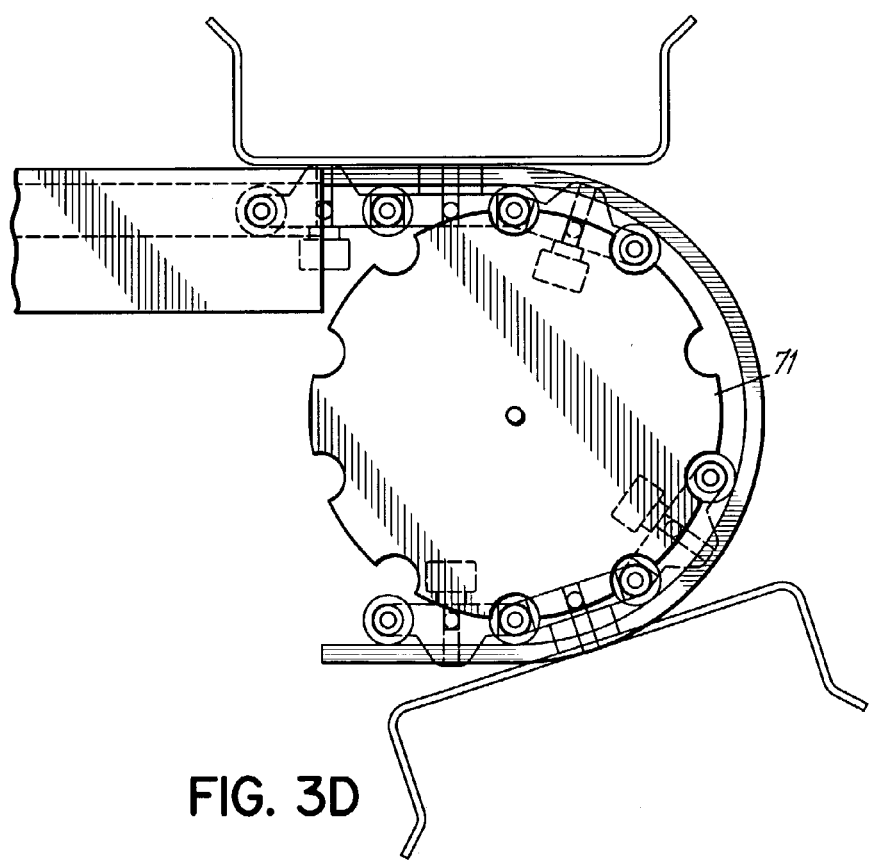
Figure 3E:
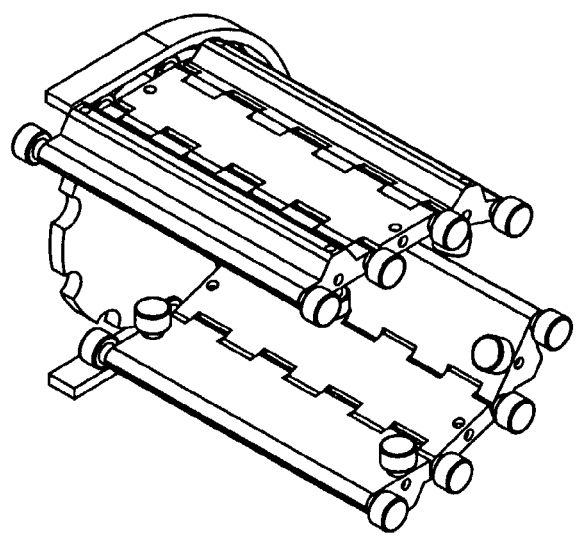
Figure 3F:
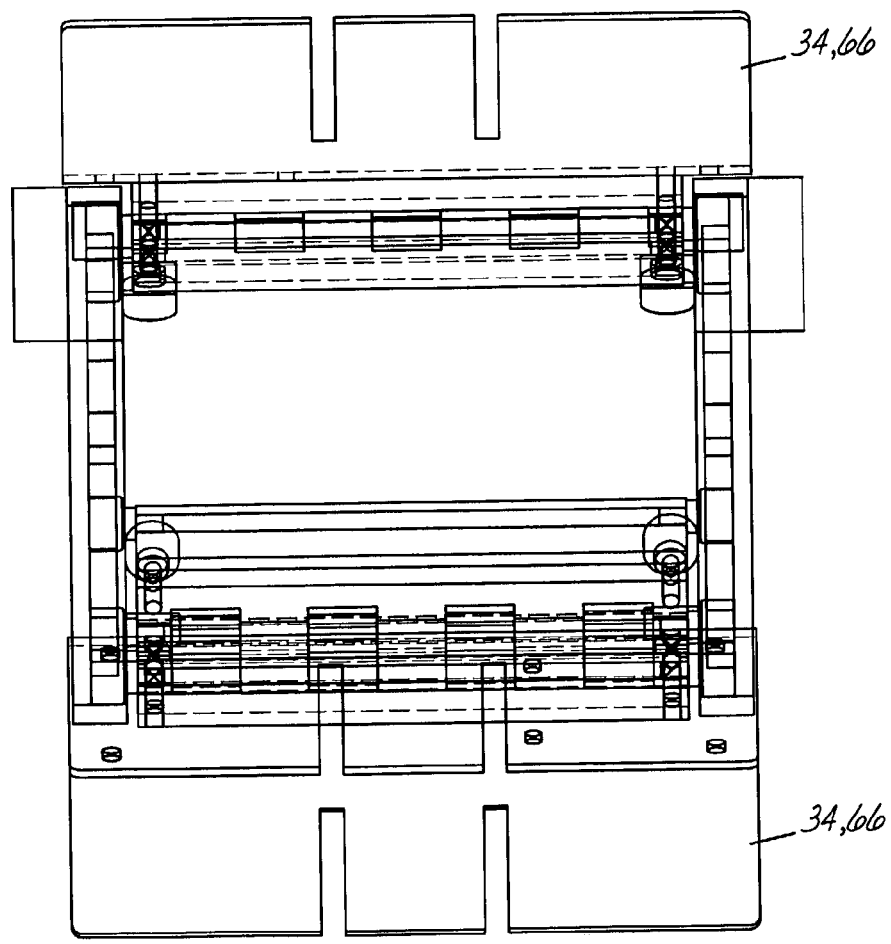

Turning now to FIGS. 3 through 3F, there is illustrated a form of vertical transfer according to the invention. This embodiment is somewhat similar to that of FIG. 2 excepting it provides a vertical transfer 60, as opposed to a horizontal transfer 32. Parts of this embodiment similar to that of FIG. 2 will be indicated with the same numbers. In this instance, product transfer 60 operates in a vertically oriented oval Path $P_5$ (represented by guide tracks 61, 62) about horizontal axes 63, 64.

An infeed 36 feeds article 38 into elements 66, comprising single buckets with dual product spaces 67, 68. These sweep around under guide tracks 61, 62 which eventually support the products 38 until they fall into buckets 48, 49 of conveyor 34, also operating in a vertical plane in Path $P_6$. Again, preferably two or more linear motors 54, 56 drive elements 66 about Path $P_5$. One linear motor could be used to define Path $P_5$ As in the FIG. 2 embodiment, elements 66 are asynchronously driven by linear motors 54, 56 except in the section of Path $P_5$ operable through the infeed area at 36 and through the drop-off area 70 over buckets 48, 49.

Elements 66 are thus independently driven by motors 54, 56 and are driven under the influence of the external axis of product infeed 36 and of the external axis of the product buckets in conveyor 34.

FIG. 3B illustrates how the elements 66 are mounted on roller carriages 68 driven along tracks 69 by the linear motors 54, 56 (not shown in FIG. 3B) and the end drives about the semicircular portions of the Path $P_5$. FIG. 3B also illustrates how the elements 66 can be comprised of two sub-buckets or trays 66a, 66b, with element 66 formed up under the influence of an external axis of the infeed 36 and the bucket conveyor 34, and then sub-elements 66a, 66b transported independently through the remainder of the Path $P_5$.

FIGS. 3C–3F illustrate further details of a mechanical drive for buckets of conveyor 34 about the semicircular segments of Paths $P_4$, $P_6$ respectively. End sprockets 71, 72 operably disposed at the ends of carriage guide rails 73, 74 receive the bucket chain or mechanical belt and pull the buckets about the semicircular section of the paths.

Figure 5:
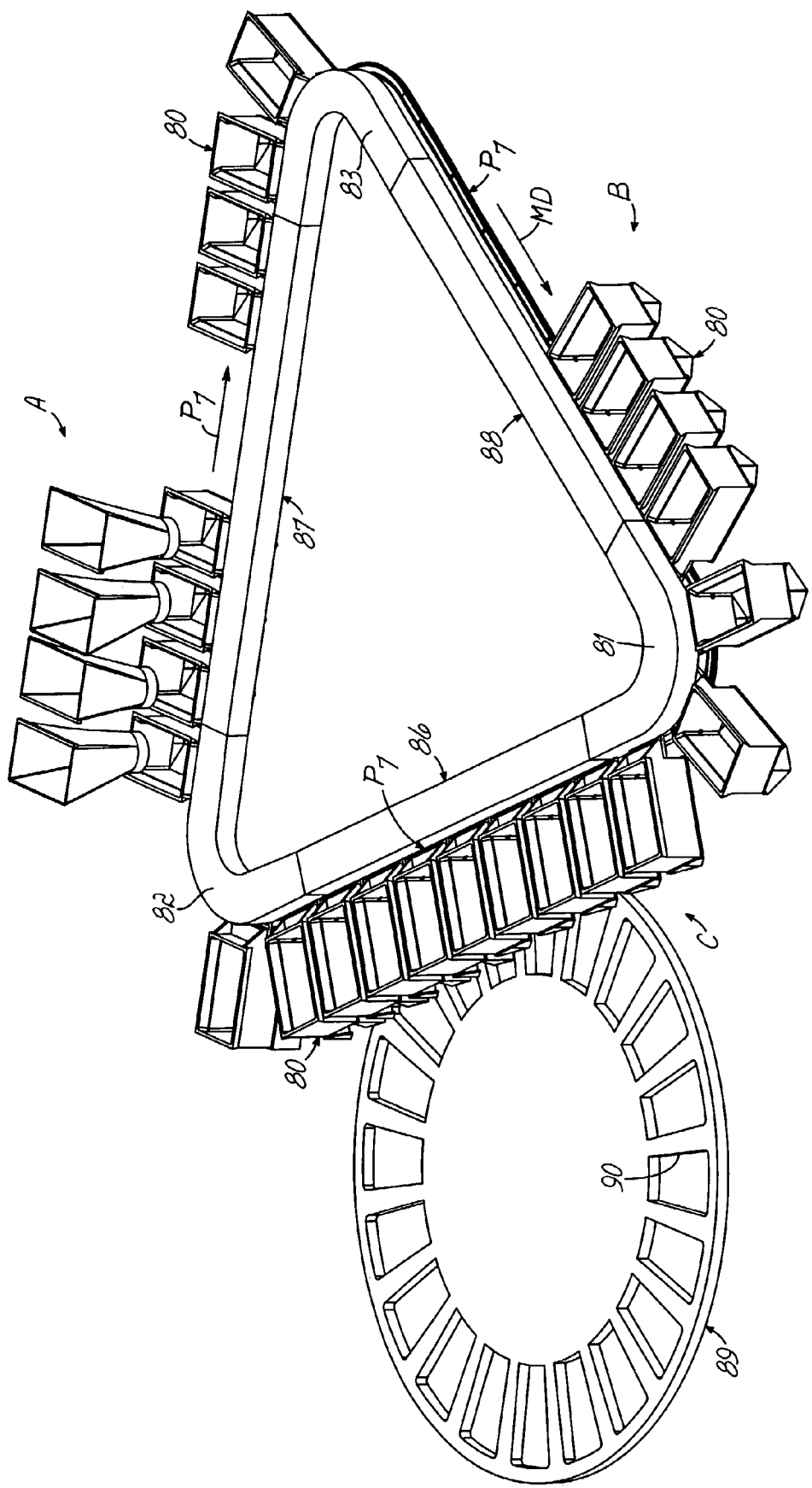
FIG. 5 is a perspective view of a weigh scale product transfer interfaced with a filler wheel in accordance with the invention where product receivers or elements are transported, for example only, in a triangular path, each receiver driven in said path independently of other receivers in said path and wherein receivers can be grouped (at "A") to receive product from and under the influence of the external event represented by the net weigh scale, queued at "B" awaiting discharge, under another influence of another external axis, and aligned and indexed at "C" to discharge product to a filler wheel under the external axis or external event represented by the filler wheel or some downstream process or function, for example.
Figure 5A:
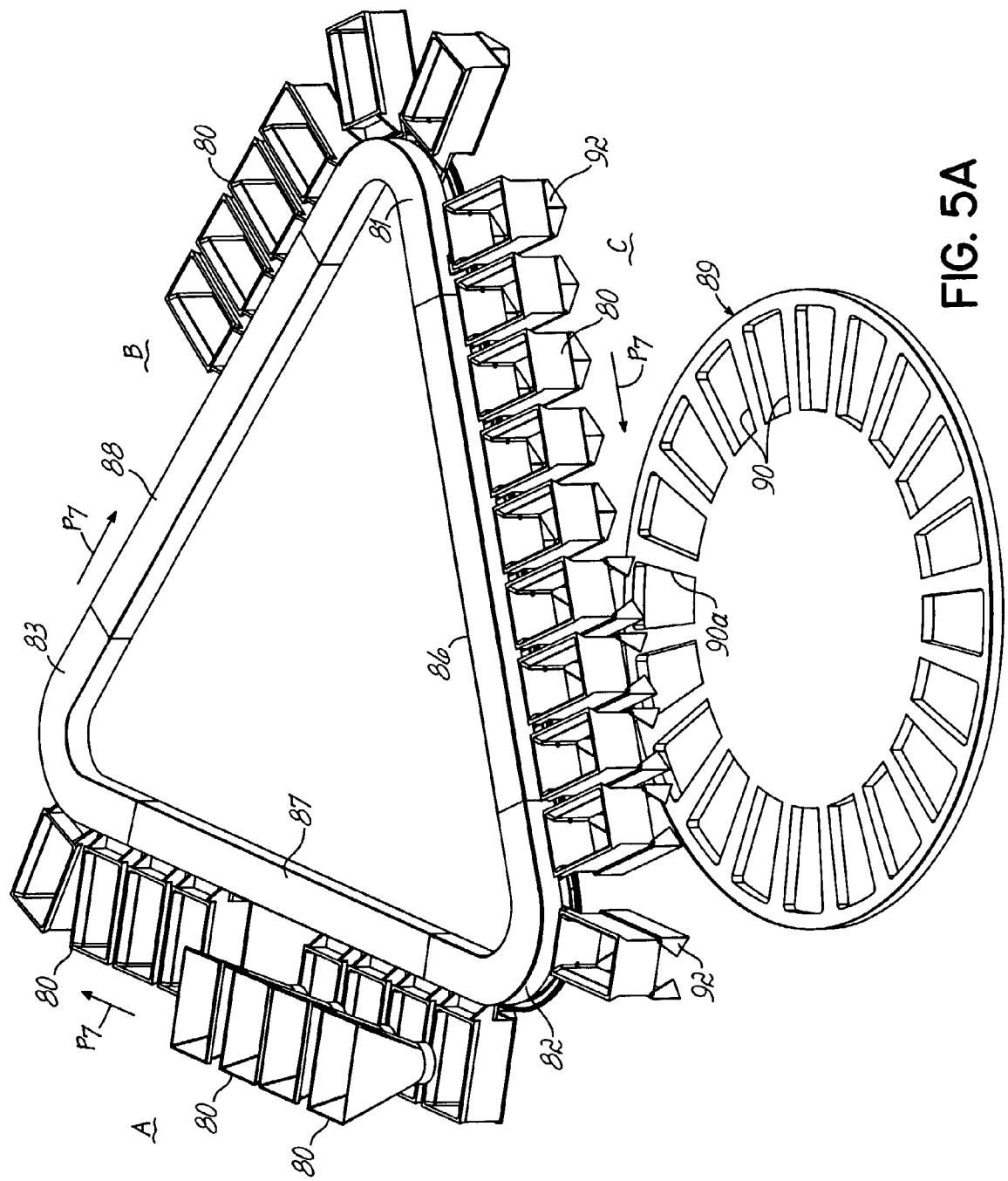
FIG. 5A is a perspective view of the invention of FIG. 5 taken from the filler wheel side.

Turning now to FIGS. 5 and 5A, there is shown a product or packaging system 78 according to the invention wherein product hoppers or elements 80 are conveyed by one or more linear motors along a three-sided Path $P_7$ for receiving product from an infeed such as a weigh scale (not shown) and conveying product to a filler wheel for filling in pouches. In this embodiment, straight conveyor runs A, B and C define, along with turns 81, 82, 83, the three-sided Path $P_7$ Turns 81, 82, 83 may be mechanical devices, separate linear motors themselves, part of linear motors 86, 87, 88 or part of a single linear motor. A respective linear motor 86, 87, 88 is respectively associated with a run A, B or C which are segments of Path $P_7$. One linear motor could be used, operably extending around the entire path.

Run C is operatively disposed over a pouching filler wheel 89 having a plurality of receptors, chambers or gates 90 to receive weighed measures of product from elements 80 and for delivering them to a pouch for filling and sealing in the pouch. This is especially useful for packaging particular products such as particulates, powders, chemicals, foods or the like.

Each element or hopper 80 is provided with a dump gate mechanism 92 shown closed in the beginning of run C and open at the end of run C after dumping contents of hoppers 80 into openings 90 of filler wheel 89. These gates 92 are synchronized according to the invention with an opening at about 90a in wheel 89 to dump contents of hoppers 80 therein with a separate opening 90 presented seriatim beneath a following hopper 80.

It will be appreciated that linear motors 86, 87, 88 drive the carriage-mounted hoppers about Path $P_7$, each independently of the other and each in a selected segment of the Path $P_7$. The elements may be operated by the motors under the influence of an external axis, either for receiving a measured product load from a weigh scale, for example, in run A, or to synchronize a hopper with an opening 90 in wheel 89 in run C.

The hoppers 80 may be lined up in groups such as groups of four at the beginning of run C to receive product drops one through four from an operative weigh scale situated above the hoppers. In this configuration then, hoppers 80 in at least part of run C will be independently driven in Path $P_7$ by linear motor 87 under the influence of the external axis of the weigh scale.

And in run C, hopper 80 will be driven in a segment of Path $P_7$ so as to synchronize in position, velocity and/or acceleration with an opening 90 in filler wheel 89 to dump a measured product load for pouching.

It will be appreciated that some hoppers 80 can be grouped in groups independent of other hoppers 80 and in a different synchronous move to those of other hoppers 80, and the filler wheel discharge in run C, for example. Thus, the movement of hoppers 80 in run C and those hoppers 80 in run A are totally independent and asynchronous.

Moreover, the system 89 also independently operates hoppers 80 in run B to line them up for receipt in run C but asynchronously or synchronously with respect thereto.

It will thus be appreciated that a product or packaging system transfer may have a plurality of segments in a recirculating conveying path through which operative elements are moved independently of all other elements in the path, and with an inertia at any position point of only the element at that position, i.e. exclusive of other elements or drive components in the same system.

Figure 6:
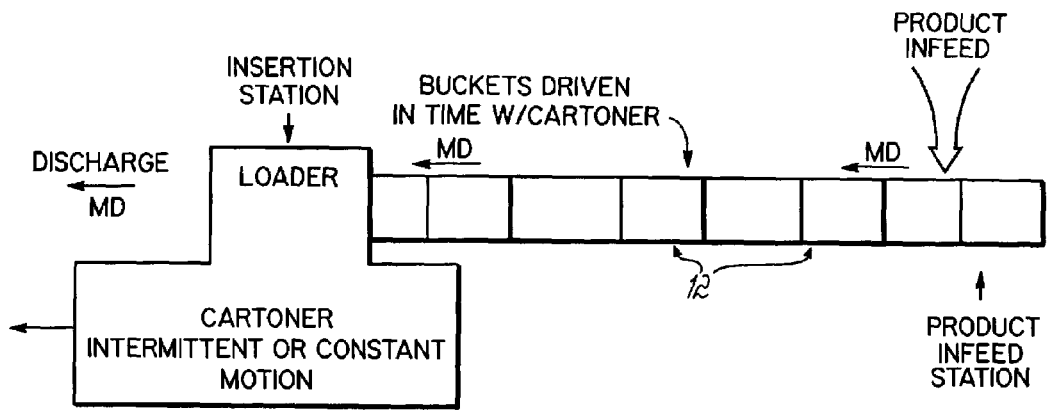
FIG. 6 is an illustrative plan view of a cartoner according to the invention and illustrating use of independently driven product buckets (or elements) operating with some buckets timed to the cartoner and some buckets timed or driven in response to random external events in the product infeed, independent of the cartoner timing.

With attention to FIG. 6, there is illustrated therein an overall packaging operation wherein products are fed into buckets, loaded into cartons and cartons are discharged. This illustrates the function of the packaging operation of FIG. 1, for example, wherein buckets are independently driven by linear motors, filled, and product transferred into cartons which are sealed or discharged. At the product infeed, buckets are driven by a linear motor under the influence of an external axis defined by random events occurring at the infeed and independently of other buckets at other points along the bucket path to synchronize with the infeed. As buckets are filled, they are moved into the cartoner for transfer of their product loads into cartons. Here, the buckets are driven in synchronization with cartons of the cartoner, wholly independent of other buckets along the bucket path. Filled cartons are then sealed and discharged from the cartoner.

Accordingly, the buckets, driven along a path by a linear motor, are driven in portions of the path under the influence of the external axis of random events, such as at the infeed or the influence of an external axis of a synchronous or asynchronous operation of the cartoner. Position of one bucket with respect to another is not critical and any bucket can be registered and synchronized in position, velocity and/or acceleration with an adjoining or operational element or function independent of other buckets in the bucket path.

Figure 7:
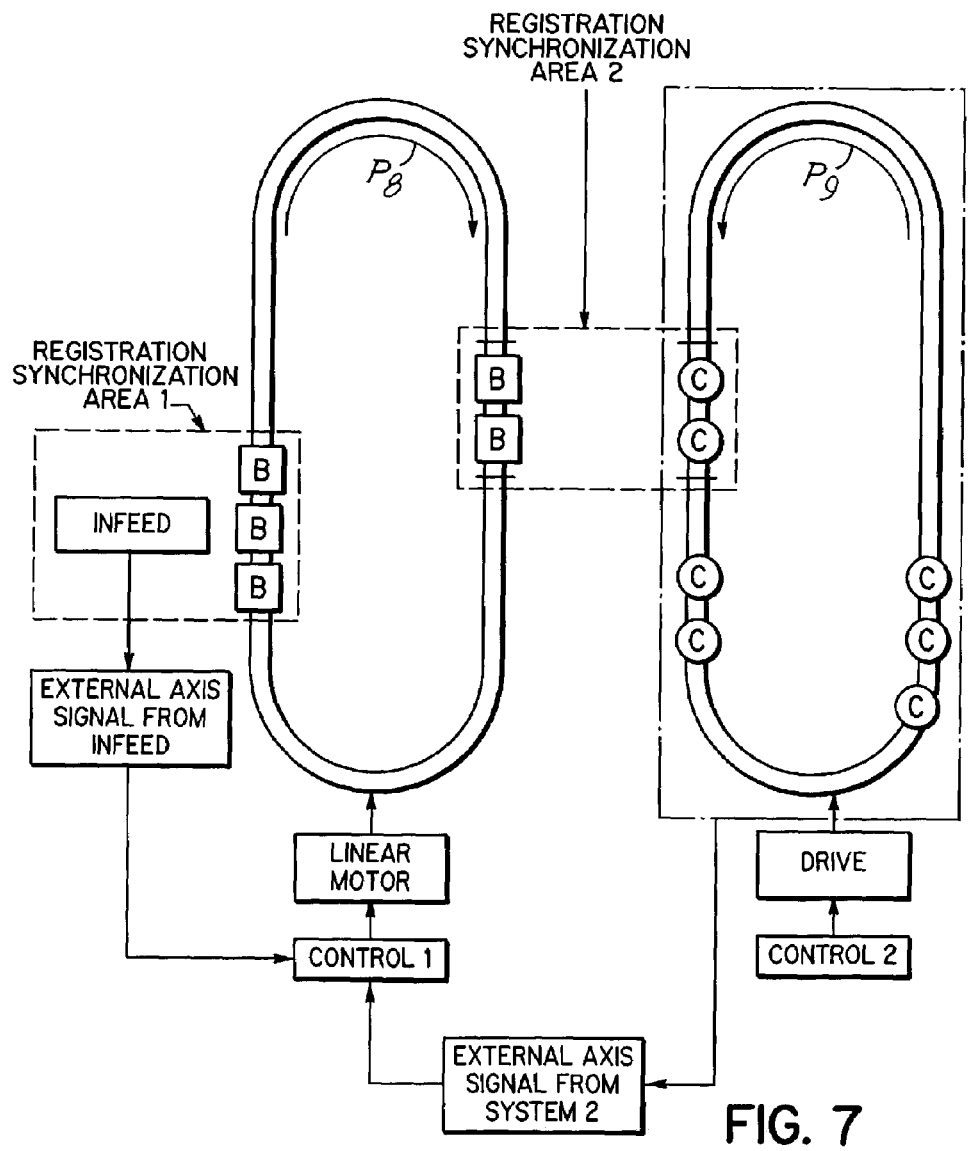
FIG. 7 is an illustration of the operational components of a packaging system and process according to the invention.

For further understanding of the invention, attention is directed to FIG. 7 wherein two adjoining conveying systems noted as System 1 and System 2 are depicted. System 1 comprises a linear motor-driven conveyor system including a plurality of buckets B, each independently driven in Path $P_8$ by the linear motor. System 2 comprises a plurality of lug sets, driven by a drive of either convention form or by a linear motor to move cartons C around Path $P_9$. Respective controls operate the linear motor or the drive as illustrated. An infeed is operationally adjoined to System 1 to feed products into buckets B in registration, synchronization area 1.

From the infeed, an external axis signal is generated and operationally connected in any suitable manner to Control 1 so that buckets B in area 1 are driven by the linear motor under the influence of the external axis from the infeed. These buckets in area 1 are first registered then synchronized to receive selected loads from infeed. The linear motor drive for these buckets in area 1 is independent also of any external axis from System 2.

Thereafter, buckets B exit area 1 and are driven by the linear motor in Path $P_8$ to area 2. There, the buckets B are driven by the linear motor under the influence of an external axis signal from System 2 to register with an in synchronization with cartons C in area 2. The buckets B here are driven independently of other buckets B anywhere in Path $P_8$ and independently of the external axis of the infeed.

Once the position, velocity and/or acceleration of the adjoining system components are known, any suitable software and control input representing the external axis can be used to influence the linear motor for driving in synchronization the independent registering and elements of the linear motor driven system, and the particular linear motor system or extended axis signal or software is not critical to a part of the invention claimed herein.

It will be further appreciated that in a packaging system and process according to the invention, the linear motor-driven elements are first registered then synchronized with the operationally adjoining elements of an adjacent packaging operation. For example, an element may be registered with an adjoining component in one area of the system, then actually synchronized with the position, velocity and/or acceleration with that component in the synchronization area. It is not necessary that registration control for any element takes place in a coextensive synchronous area. Registration and synchronization may overlap or may not, but the element is synchronized in a synchronization area with the adjoining component to carry out product insertion into a carton, product infeed into a bucket or some other packaging function.

For the purposes of this disclosure, the term "registration" includes determining where a component or element needs to be downstream and the taking of steps such as release, acceleration or deceleration to be there. The term "synchronization" means the transport of a component or element in operative position, velocity and/or acceleration with another element for a time period over a distance to accomplish a function, such as the packaging function of article transfer or insertion.

The packaging operations demonstrated through the application of the invention are numerous. Upstream or downstream aberrations will no longer cause waste or undue delay. A packaging system can accommodate between operational areas or events so primes are provided in clearing any aberrations. System inertia is reduced to that of a single product or package component carrier and lighter weight, less costly, less noisy apparatus can be used. Packaging system flexibilities are increased and operational delays in system components can be assuaged or smoothed without having the entire system slowed due to the slowest component. Emergency stop circumstances are ameliorated.

In yet another advantage of the invention, it will be appreciated that the use of a linear motor, independently driving separate system elements, can greatly reduce the cost and expense of both change over parts and the downtime expense of change over protocols when articles or packages of different sizes or requiring different pitch or spacing are to be handled. In this regard, it is known that packaging machines of various types, such as cartoners or pouch machines, are designed so they can be modified to handle items such as articles, article groups or packages (including but not limited to cartons and pouches) of different sizes and at different pitch or spacings. Such modifications require and are attended by the cost of change over parts, bigger, smaller or the like, and the expense of downtime to take off and add, or adjust, the components of the equipment. Thus, product guides, for example, or lugs, are mechanically adjusted with regard to their spacing or are changed to accommodate the parameters of different articles, article groups or packages.

Application of the benefit of linear motors independently driving the normally changed or adjusted components eliminates substantially, if not all, these costs and expenses. For example only, to handle cartons of different sizes or at different speeds or pitch, it is only necessary to adjust the programming of a linear motor to independently drive the carton conveying lugs at different speeds, accelerations or spacing. The new carton erection and conveying speeds, sizes and pitch are thus readily accommodated through the linear motors independently controlling and driving the elements or lugs. Mechanical change parts and changeover downtime are substantially reduced or eliminated.

Accordingly, article buckets can be formed by front and back walls, each defined by an independently driven element driven by a linear motor. Those can be adjusted with respect to spacing from each other, and each cooperating set with respect to spacing from another set to accommodate different articles and article group sizes and different pitch between articles or article groups. Such adjustment is through the independent drive of the linear motor, without need for extensive change parts or downtime.

These and other modifications, embodiments and advantages will become readily apparent to those of ordinary skill in the art without departing from the scope of the invention, and applicant intends to be bound only by the appended claims.

What is claimed is:

1. In a packaging process having two conveying systems therein for respectively conveying articles and cartons, the steps of:
    driving one of said systems with a common drive comprising at least one linear motor wherein articles or cartons thereon are driven independently of each other,
    synchronizing the articles or cartons driven by said linear motor with the position and velocity of other articles or cartons in the other systems under the influence of a signal representing an external axis of said other system, and transferring articles in respective cartons synchronized therewith.

2. In a process for handling items and packages to be combined, the steps of:
   driving at least one of said items or packages by a common drive, in one path independently of other items or packages in said one path driven by said common drive, and adjacent other items or packages respectively in an adjacent other path,
   while controlling movement of selected items or packages driven by said common drive in a portion of said one path under the influence of an external axis and moving other items or packages driven by said common drive in said one path independently of said external axis, wherein
   said common drive comprises at least one linear motor, and
   combining respective items with respective packages conveyed adjacent said one path.

3. In a process, for handling items and packages to be combined, the steps of moving, with a common drive comprising at least one linear motor, one of said items and packages in a respective path independently of other items or packages in said respective path driven by said common drive and, in a section of said respective path, registering movement of said one of said items or packages to an external axis while continuing independent movement of other said items or packages in said respective path independently of said external axis, and combining respective items with respective packages with the other of said items or packages moving in a path adjacent to said respective path.

4. In a packaging process wherein items moving in one path are to be combined with packages moving in another path, the steps of moving one of said items and packages in its respective one path independently of others in the same one path and asynchronously with respect to the other of said item and packages in said another path, and synchronizing one of said items and packages in a section of its respective one path with movement of the other of said items and packages in its respective another path for combining them, and responsive thereto while continuing to move other unsynchronized items or packages in said one path of said synchronized items or packages but outside of said section in asynchronous movement, wherein said moving step is carried out by a common drive comprising at least one linear motor.

5. In a packaging process for placing items into packages, the method steps comprising:
   moving said items and packages in separate, respective first and second paths, at least one of said items and packages moving in its respective path independently of other items or packages in the same path;
   said moving step of items and packages being carried out by a common drive comprising at least one linear motor cooperatively associated with each path,
   operably registering one of said items and packages with the other of said items or packages in a section of a respective path thereof by synchronizing movement of said one of said items and packages in a section of its respective path with the other of said items and packages in its respective path, while moving other of said items and packages in the same path as the synchronized item or package asynchronously in the same path but outside said section so that one of said synchronously moved items and packages can be combined with the other in said section.

6. In a packaging method of transferring at least one item in a bucket to a package wherein a plurality of buckets are moved in a first path and a plurality of packages are moved in a second path, and wherein at least one of said buckets in said first path and said one of said packages in said second path are moved in their respective path independently of each other and asynchronously with respect to one of said buckets and packages in another path by a respective common drive comprising at least one linear motor, the steps including:
   registering a bucket in a section of said first path with a package in a section of said second path by synchronizing movement of one of said buckets in said first path section and said one of said packages in said second path section with the other, while one of the other respective buckets and packages in the same respective paths as the synchronized buckets and packages are moved asynchronously with respect thereto,
   moving at least one of said buckets or said packages with at least one linear motor; and
   transferring an item from a bucket in one section to a package in another section.

7. A packaging method as in claim 6 wherein buckets on said section of said first path are synchronized with packages in said section of said second path and other buckets in said first path outside of said sections of said first path sections move asynchronously with respect to said packages in said section of said second path.

8. A packaging method as in claim 6 wherein packages in said section of said second path are synchronized with buckets in said sections of said first path and other packages in said second path outside of said section of said second path move asynchronously with respect to said buckets in said section of said first path.

9. In a packaging method for packaging items into packages, the steps including:
   moving packages along a first path independently of other packages in said first path;
   moving items for packaging in another second path;
   one of said moving steps carried out by a common drive for driving said packages in said first path or said items in said second path independently of other packages or items in a respective path, and said drive comprising at least one linear motor; and
   said packages moving step including moving said packages in said first path asynchronously with respect to said items in said second path and including the further step of registering respective packages in a section of said first path with items in a section of said second path by synchronizing movement of packages in said first path section with said items operatively disposed in said section of said second path adjacent said first path section while other packages in said first path outside said section of said first path are moved asynchronously; and
   transferring items into packages from and into said respective sections.

10. In a method for transporting items to be packaged, the method of placing items into item carrying buckets, said method including the steps of:
   moving items in a first path,
   moving buckets in a second path independently of other buckets in said second path and asynchronously with respect to said items, said second path having a receiving section wherein buckets in said section of said second path each may receive at least one item, and said method further including:

registering a bucket in said section of said second path with an item to be received in said bucket by synchronizing said bucket with said item in a section of said first path and transferring said at least one item into said bucket registered therewith, and at the same time moving buckets in said second path outside said section of said second path asynchronously with respect to buckets in said section of said second path, wherein at least one of said moving steps is carried out by a common drive comprising at least one linear motor.

11. A method of transferring articles from an article supply into cartons, said method including the steps of:

moving article receiving cartons through a first path, including driving each carton in said path with at least one linear motor and comprising a common drive and independently of the other cartons in said path;

said drive being controlled under the influence of an external axis, represented by position and movement of articles ready for transfer, presenting articles for transfer in a position adjacent said path in a predetermined sequence and introducing said articles into respective cartons in said path, by driving cartons in a section of said path at said position responsive to said external axis.

12. A method as in claim 11 including the further step of introducing articles into respective cartons moving at a velocity less than that of other cartons in said path.

13. A method as in claim 11 including the step of introducing articles into cartons stopped in said path while other cartons in said path are moving.

14. A method as in claim 11 including introducing groups of articles into article group carriers, movable in a second path, and from there, then into cartons in said first path.

15. A method as in claim 11 including the step of indexing any motion of a selected carton in said path with a selected article group carrier for transfer of an article group into said selected carton.

16. A method as in claim 11 including carrying out said transfer of an article group into a carton when said carton is at least moving more slowly than other cartons in said first path.

17. A method as in claim 11 wherein said articles to be transferred are in groups carried in group carriers moving in a second path and including carrying out said transfer of an article group into a carton where the article carrier from which said group is transferred is at least moving more slowly than other article group carriers in said second path.

18. A method as in claim 11 including further steps of stopping cartons upstream in said path while moving cartons downstream in said path.

19. A method as in claim 18 including moving, closing and sealing cartons in said path downstream of cartons stopped in said path.

20. A method of transferring groups of articles from article buckets into article cartons, including the steps of:

moving article cartons in a first path, including driving each carton independently of the other cartons in said path;

moving article buckets in a second path, including driving each bucket independently of other buckets in said second path; and transferring articles from an article bucket into an article carton at a time when said bucket and cartons are operably synchronized with respect to each other, wherein at least one of said moving steps is carried out by a common drive comprising at least one linear motor.

21. A method as in claim 20 including the further steps of transferring articles from more than one carrier into a single carton operably synchronized with more than one carrier.

22. A method as in claim 21 including the further step of transferring groups of articles from more than one carrier into a single carton operably synchronized with more than one carrier.

23. A method as in claim 20 including transferring articles from one carrier into at least two cartons operably synchronized with said one carrier.

24. A method as in claim 23 including transferring groups of articles from one carrier into at least two cartons operably synchronized with said one carrier.

25. A method for transporting cartons where each carton is disposed in a path defined at least between a trailing lug at a rear edge of the carton and a leading lug proximate a leading edge of the carton, and where each leading lug is driven as a unit with a trailing lug for a preceding carton, the method comprising:

operating at least one linear motor of a common lug drive to move each of said lug units in said path independently of other units in said path;

forming selected units next to each other in said path in a selected pitch, and varying said pitch between said selected units as said sets move in said path, independently of the pitch between other sets in said path and in response to an external axis.

26. A method as in claim 25 including the further step of varying the speed of one unit in the path from that of another unit in said path.

27. In a method of cartoning wherein articles are deposited into article buckets, moved through one path and said articles are transferred from said buckets into respective cartons moving in another path, the improvement comprising the step of:

driving said buckets in said path independently of other buckets in said one path with at least one linear motor of a common drive operating under the influence of an external axis synchronizing buckets in a section of said one path with cartons in said other path and independent of other buckets in said one path outside said section; and transferring articles from buckets in said section into respective cartons adjacent said section.

28. In a method of cartoning wherein articles are transferred from an article feed into cartons moved along by carton engaging lugs moving in a path, the step of:

driving all of said lugs in said path independently of all other lugs in said path with one linear motor comprising a common drive for said lugs and operating under the influence of an external axis, wherein two of said lugs form a carton receiving pocket and said two of said lugs are driven independently of all other lugs in said path.

29. A method as in claim 28 wherein one lug for engaging one carton is operably attached to a second lug for driving another carton, said one and second tugs defining a set of tugs, and wherein said driving steps include driving said set of tugs independently of other sets of tugs in said path.

30. In a method of cartoning wherein articles to be cartoned are carried in one of a synchronous or asynchronous motion and wherein cartons for receiving said articles are driven in another one of said synchronous or asynchronous motions, and wherein articles are combined with cartons, the improvement comprising the step of:

generating said motions with at least one linear motor comprising a common drive for all said articles or cartons respectively and operating under the influence of an external axis represented by the other of said motions.

31. A method of cartoning as in claim 30 wherein said motions are carried out through respective paths, each article and carton motion being independent of each other article and carton motion in each of said respective paths.

32. In a method of cartoning where articles are fed through an article infeed into cartons, said article infeed being driven in response to upstream events in said article infeed and wherein cartons are driven synchronously to receive articles at a loading area from said article infeed in response to events occurring downstream of said loading area, said method further including the step of driving one of said articles and said cartons in a respective path with at least one linear motor, wherein one of said articles or said cartons in said respective paths are each independently driven with respect to other of said articles or cartons in said path.

33. In a method of cartoning wherein articles are carried in buckets driven in a portion of a first path at one pitch and cartons are driven in a second path at said pitch to receive articles, the steps of changing said pitch by driving said buckets and said cartons in said respective paths each independently of other buckets or other cartons in said respective paths and driving at least one of the buckets and cartons with at least one linear motor operating under the influence of an external axis representative of pitch, and defining a common drive for said buckets or said cartons, respectively.

34. In a method of cartoning in a cartoner having article receiving components moving in a path at a pitch and the method comprising changing said pitch in a section of said path by driving each of said components in said path with a common drive independently of other components in said path wherein said common drive comprises at least one linear motor operating under the influence of an external axis representative of pitch, and dispensing articles from a conveyor moving parallel to said section into said receiving components in said section of said path and at a timed sequence determinative of pitch of said article receiving components in said section independent of the pitch of the other article receiving components in said path spaced from said station.

35. In a method of cartoning wherein article receiving buckets are driven through a oath by a common drive comprising at least one linear motor, the steps of driving buckets in said path, each independently of other buckets in said path, with said linear motor operating under the influence of an external axis, driving some of said buckets at one speed in said oath and independently driving other buckets in said path at a different speed, and wherein said path includes an operative run having an receiving article portion, an article discharging portion, and a bucket return run.

36. A method as in claim 35 including driving said buckets at said different speeds in said receiving and discharge portions of said operative run.

37. A method as in claim 36 including driving said buckets at a speed in said return run independently of the speeds of buckets in said operative run.

38. In a cartoner having a product infeed and a plurality of independently driven buckets for delivering articles to be cartoned from a product infeed station to an insertion station for insertion into respective cartons, the method comprising the step of driving driven buckets proximate said insertion station with a common drive comprising at least one linear motor in synchronization with said cartoner and driving driven buckets proximate said product infeed stations with a common drive comprising at least one linear motor in response to random events occurring in said product infeed, and independently of the motion of buckets proximate said insertion station.

39. In a packaging method for combining articles with cartons, the steps of:

driving a plurality of article receiving buckets with a common drive comprising at least one linear motor, each bucket being driven in a first path independently of other buckets in the path, driving a plurality of cartons in a second path having a section operably disposed proximate said first path, synchronizing buckets in a section of said first path in position and velocity with cartons in said second path section by operating said linear motor in said first path section under the influence of an external axis signal representing a parameter of a carton on said second path section, and transferring articles in said buckets with cartons respectively synchronized with said buckets.

40. In a packaging method wherein a plurality of packaging machine elements are driven by a common drive, operating in a common drive path and comprising at least one linear motor, in a single element path independently of other elements in said path, the step of driving said elements in a portion of said path by at least one linear motor operating under the influence of an external axis, and generating a signal from an external axis represented by a function of a packaging machine other than the driving function of said at least one linear motor.

* * * * *